United States Patent
Tseng et al.

(10) Patent No.: US 11,979,780 B2
(45) Date of Patent: May 7, 2024

(54) DEDICATED SYSTEM INFORMATION BLOCK REQUEST

(71) Applicant: FG Innovation Company Limited, Tuen Mun (HK)

(72) Inventors: Yung-Lan Tseng, Taipei (TW); Hung-Chen Chen, Taipei (TW); Mei-Ju Shih, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 130 days.

(21) Appl. No.: 17/370,302

(22) Filed: Jul. 8, 2021

(65) Prior Publication Data

US 2022/0014980 A1    Jan. 13, 2022

Related U.S. Application Data

(60) Provisional application No. 63/049,577, filed on Jul. 8, 2020.

(51) Int. Cl.
*H04W 36/00* (2009.01)
*H04W 36/06* (2009.01)
(Continued)

(52) U.S. Cl.
CPC ....... *H04W 36/0061* (2013.01); *H04W 36/06* (2013.01); *H04W 36/08* (2013.01); *H04W 76/30* (2018.02); *H04W 92/18* (2013.01)

(58) Field of Classification Search
CPC . H04W 36/0061; H04W 76/30; H04W 36/06; H04W 36/08; H04W 92/18;
(Continued)

(56) References Cited

U.S. PATENT DOCUMENTS

| | | | |
|---|---|---|---|
| 11,671,901 B2* | 6/2023 | Tseng | H04W 48/12 455/434 |
| 2011/0320856 A1 | 12/2011 | Deivasigamani et al. | |

(Continued)

FOREIGN PATENT DOCUMENTS

| | | | | |
|---|---|---|---|---|
| CA | 3099967 A1 | * | 11/2019 | H04W 48/10 |
| CN | 101697614 B | * | 12/2014 | H04W 48/16 |

(Continued)

OTHER PUBLICATIONS

ATT,"[C701]ProhibitTimerforonDemandSIBRequestinRRC_CONNECTED", R2-2004795,3GPPTSG-RAN G2Meeting#110electronic, Online,Jun. 1-Jun. 12, 2020 (Year: 2020).*

(Continued)

*Primary Examiner* — Ayaz R Sheikh
*Assistant Examiner* — Louis Samara
(74) *Attorney, Agent, or Firm* — ScienBiziP, P.C.

(57) ABSTRACT

A method for requesting a target system information block (SIB) associated with a target service is provided. The method initiates a dedicated SIB request procedure to send, to a serving cell, a request for the target SIB. The method initiates the dedicated SIB request procedure while the UE has stored at least one SIB segment of a plurality of SIB segments associated with the target SIB, and before the target SIB is successfully assembled based on the plurality of SIB segments. The method transmits, to the serving cell, the request for the target SIB to the serving cell and upon the transmission of the request starts a timer, where a second dedicated SIB request procedure is not allowed to be initiated while the timer is running.

20 Claims, 9 Drawing Sheets

(51) Int. Cl.
*H04W 36/08* (2009.01)
*H04W 76/30* (2018.01)
*H04W 92/18* (2009.01)

(58) Field of Classification Search
CPC ......... H04W 76/27; H04W 4/06; H04W 4/40; H04W 48/12; H04L 1/1614; H04L 5/0058
See application file for complete search history.

(56) References Cited

U.S. PATENT DOCUMENTS

| | | | | |
|---|---|---|---|---|
| 2017/0215047 | A1* | 7/2017 | Lee | H04L 12/1895 |
| 2019/0150071 | A1* | 5/2019 | Lee | H04W 4/06 |
| | | | | 370/328 |
| 2019/0158988 | A1* | 5/2019 | Lee | H04W 76/27 |
| 2019/0215858 | A1 | 7/2019 | Ishii | |
| 2019/0394690 | A1* | 12/2019 | Shih | H04W 48/20 |
| 2021/0185758 | A1* | 6/2021 | Agiwal | H04W 48/14 |
| 2022/0191733 | A1* | 6/2022 | Ali | H04W 4/46 |
| 2023/0019892 | A1* | 1/2023 | Gordaychik | H04L 5/0058 |

FOREIGN PATENT DOCUMENTS

| | | | | |
|---|---|---|---|---|
| KR | 102397784 | B1 * | 6/2019 | ............ H04W 48/20 |
| KR | 102397784 | B1 * | 10/2019 | |
| WO | WO-2017196057 | A2 * | 11/2017 | ........... H04L 1/1614 |
| WO | WO-2021235860 | A1 * | 11/2021 | ............ H04W 48/12 |

OTHER PUBLICATIONS

ZTE Corporation, Sanechips, "[Z113] [Z117] Text proposal for accepted RIL issues", R2-2005597, 3GPP TSG-RAN WG2 Meeting#110, Electronic, Jun. 1-12, 2020.

CATT, "[C701] Prohibit Timer for on Demand SIB Request in RRC_Connected", R2-2004795, 3GPP TSG-RAN WG2 Meeting #110 electronic, Online, Jun. 1-Jun. 12, 2020.

LG Electronics, "Resolving open issues for on-demand SI", R2-2001522, 3GPP TSG-RAN WG2 Meeting #109, E-meeting, Feb. 24-Mar. 6, 2020.

3GPP TS 38.331, "3rd Generation Partnership Project; Technical Specification Group Radio Access Network; NR; Radio Resource Control (RRC) protocol specification (Release 16)", V16.0.0 (Mar. 2020).

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 16)", V16.0.0 (Mar. 2020).

3GPP TS 38.304, "3rd Generation Partnership Project; Technical Specification Group Radio Access Network; NR; User Equipment (UE) procedures in Idle mode and RRC Inactive state (Release 16)", V16.0.0 (Mar. 2020).

3GPP TS 38.300, "3rd Generation Partnership Project; Technical Specification Group Radio Access Network; NR; NR and NG-RAN Overall Description; Stage 2 (Release 16)", V16.1.0 (Mar. 2020).

3GPP TS 23.501, "3rd Generation Partnership Project; Technical Specification Group Services and System Aspects; System architecture for the 5G System (5GS); Stage 2 (Release 16)", V16.4.0 (Mar. 2020).

3GPP TS 38.401, "3rd Generation Partnership Project; Technical Specification Group Radio Access Network; NG-RAN; Architecture description (Release 16)", V16.1.0 (Mar. 2020).

3GPP TS 38.401, "3rd Generation Partnership Project; Technical Specification Group Radio Access Network; NG-RAN; Architecture description (Release 16)", V16.0.0 (Dec. 2019).

3GPP TS 36.304, "3rd Generation Partnership Project; Technical Specification Group Radio Access Network; Evolved Universal Terrestrial Radio Access (E-UTRA); User Equipment (UE) procedures in idle mode (Release 16)", V16.0.0 (Mar. 2020).

* cited by examiner

DEDICATED SYSTEM INFORMATION BLOCK REQUEST

CROSS-REFERENCE TO RELATED APPLICATION(S)

The present application claims the benefit of and priority to a provisional U.S. Patent Application Ser. No. 63/049,577, filed on Jul. 8, 2020, entitled "SYSTEM INFORMATION REQUEST PROCEDURE FOR USER EQUIPMENT," (hereinafter referred to as "US81950 application"), the content of which is hereby incorporated fully by reference into the present application.

FIELD

The present disclosure generally relates to wireless communications, and more particularly, to requesting a target system information block (SIB) associated with a target service via a dedicated SIB request in the next generation wireless networks.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

According to the 3rd Generation Partnership Project (3GPP) NR, system information (SI), or SIBs, may relay numerous control information to the UEs. For example, an emergency-related message, such as an earthquake message, that may be sent to several UEs, may include many different pieces of information that have to be transmitted to the UEs. Because of the high amount of information, a cell (e.g., associated with a base station) may divide or segment the data of a SIB into different groups or segments, which are called SIB segments. As an example, for an NR/E-UTRA Vehicle-to-Everything (V2X) sidelink communication service, NR/E-UTRA sidelink service, NR/E-UTRA PC5 service, one or more base stations (e.g., gNBs) in the NR-Radio Access Network (NR-RAN) may divide the system information (SI) (or the system information block (SIB)) associated with the NR V2X service (and/or an LTE V2X service and/or an NR sidelink service) into several smaller SIB segments. For example, a SIB12 of a V2X service may be divided into two or more SIB12 segments (e.g., by one or more serving cells). A UE that has interest in the NR sidelink communication service may then store all the different SIB segments that are received from the UE's serving cell(s). Once all the segments of the target SIB (e.g., SIB12) are successfully received and stored, the UE may attempt to assemble the complete/target SIB.

Furthermore, a serving cell may also broadcast other data, such as other parameters, that are associated with each segment of a SIB. The data associated with each SIB segment, such as a segment number (e.g., an integer within a range of 0 to 63), a segment type (e.g., an enumerator to further indicate that a corresponding SIB segment is the last SIB segment or not), etc., may identify the corresponding (SIB) segment. Based on such received (or configured) identifying data, the UE may be able to assemble a target SIB. Taking the NR sidelink communication service as an example, the UE may implement the Access Stratum configurations of the PC5 and Uu interfaces based on the received complete/target V2X-SIB(s). To assemble a target SIB based on the received SIB segments, however, a UE does not check the validity of the SIB segments while receiving and storing the segments. To increase the efficiency of SIB segment management, it is desirable that the validity of each segment of a target SIB is checked before a SIB assembly procedure can be triggered for the target SIB.

SUMMARY

The present disclosure is directed to requesting a target SIB associated with a target service via a dedicated SIB request.

In a first aspect of the present application, a method for requesting a target SIB associated with a target service is provided. The method includes initiating a dedicated SIB request procedure to send, to a serving cell, a request for the target SIB, the dedicated SIB request procedure initiated while the UE has stored at least one SIB segment of a plurality of SIB segments associated with the target SIB, and before the target SIB is successfully assembled based on the plurality of SIB segments; transmitting, to the serving cell, the request for the target SIB; and starting a timer upon transmitting the request to the serving cell, wherein a second dedicated SIB request procedure is not initiated while the timer is running.

In an implementation of the first aspect, the method further includes receiving remaining SIB segments in the plurality of SIB segments that are not stored at the UE; assembling the target SIB based on the received and stored plurality of SIB segments while the timer is counting; and stopping the timer after successfully assembling the target SIB.

In another implementation of the first aspect, receiving the remaining SIB segments comprises receiving the remaining SIB segments from the serving cell via UE-specific downlink control signaling.

In another implementation of the first aspect, the method further includes receiving, from the serving cell, a second plurality of SIB segments associated with the target SIB; assembling the target SIB based on the received second plurality of SIB segments while the timer is counting; dropping the stored at least one SIB segment of the plurality of SIB segments after assembling the target SIB; and stopping the timer after successfully assembling the target SIB based on the received second plurality of SIB segments.

In another implementation of the first aspect, receiving the second plurality of SIB segments comprises receiving the second plurality of SIB segments after switching from a current active down link (DL) bandwidth part (BWP) to a second active DL BWP that is configured with at least one common search space for receiving system information.

In another implementation of the first aspect, the method further includes after transmitting the request, receiving, from the serving cell, the target SIB via a UE-specific downlink control signaling; dropping the stored at least one SIB segment of the plurality of SIB segments after receiving the target SIB; and stopping the timer after receiving the target SIB.

In another implementation of the first aspect, initiating the dedicated SIB request procedure comprises initiating the dedicated SIB request procedure when the UE is not configured with any common search space for receiving system information on any of currently active downlink bandwidth parts (BWPs) associated with the UE.

In another implementation of the first aspect, the target service comprises a new radio (NR) sidelink communication service and the target SIB comprises NR sidelink radio configuration containing access stratum (AS) configuration for the UE to implement the NR sidelink communication service.

In another implementation of the first aspect, the method further includes selecting a second serving cell to move from the serving cell; and after moving to the second serving cell, implementing the NR sidelink communication service based on the NR sidelink radio configuration included in the target SIB received in the serving cell after determining that the target SIB is still valid on the second serving cell.

In another implementation of the first aspect, the method further includes switching a radio resource control (RRC) state of the UE from an RRC Connected state to one of an RRC Inactive state or an RRC Idle state; and implementing the NR sidelink communication service based on the NR sidelink radio configuration included in the target SIB after switching the RRC state of the UE.

In a second aspect, a UE comprising one or more non-transitory computer-readable media having computer-executable instructions requesting a target SIB associated with a target service is provided. The processor is coupled to the one or more non-transitory computer-readable media, and configured to execute the computer-executable instructions to initiate a dedicated SIB request procedure to send, to a serving cell, a request for the target SIB, the dedicated SIB request procedure initiated while the UE has stored at least one SIB segment of a plurality of SIB segments associated with the target SIB, and before the target SIB is successfully assembled based on the plurality of SIB segments; transmit, to the serving cell, the request for the target SIB; and start a timer upon transmitting the request to the serving cell, wherein a second dedicated SIB request procedure is not initiated while the timer is running.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
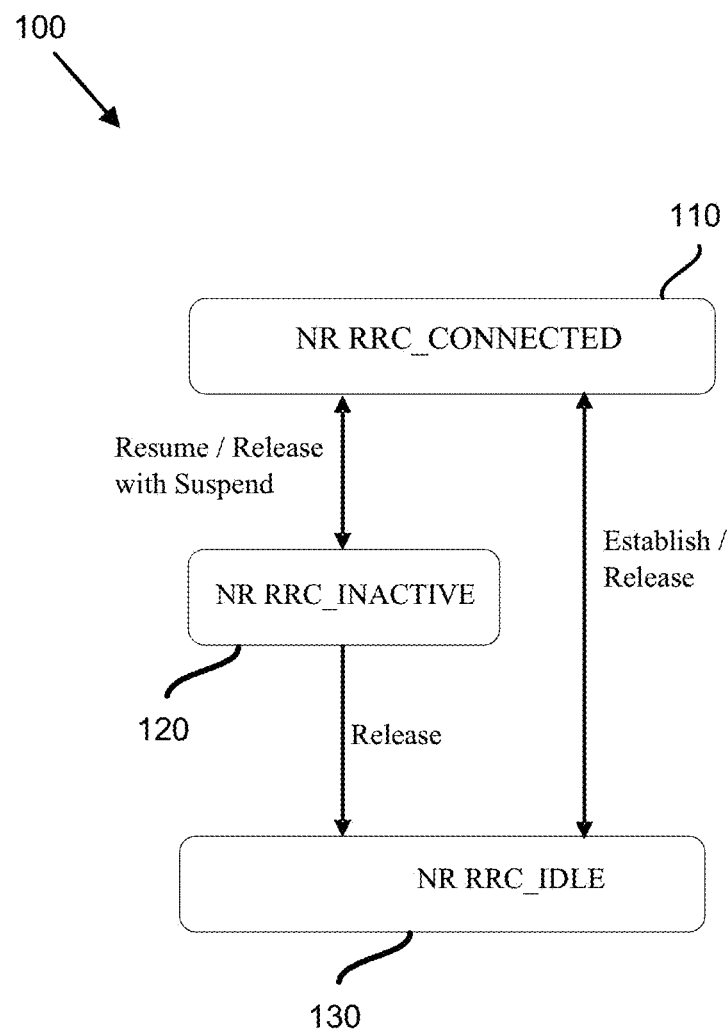
FIG. 1 is a diagram illustrating a UE state machine and the UE's state transitions, according to an example implementation of the present application.

The acronyms in the present application are defined as follows and unless otherwise specified, the acronyms have the following meanings:

| Acronym | Full name |
|---|---|
| 3GPP | $3^{rd}$ Generation Partnership Project |
| 5GC | 5G Core |
| ACK | Acknowledgement |
| AMF | Access and Mobility Management Function |
| ARQ | Automatic Repeat Request |
| AS | Access Stratum |
| BCCH | Broadcast Control Channel |
| BCH | Broadcast Channel |
| BFR | Beam Failure Recovery |
| BS | Base Station |
| BSR | Buffer Status Report |
| BWP | Bandwidth Part |
| CA | Carrier Aggregation |
| CBRA | Contention Based Random Access |
| CFRA | Contention Free Random Access |
| CG | Configured Grant |
| CM | Connection Management |
| CN | Core Network |
| C-RNTI | Cell Radio Network Temporary Identifier |
| CS-RNTI | Configured Scheduling Radio Network Temporary Identifier |
| CSI-RS | Channel State Information Reference Signal |
| DCI | Downlink Control Information |
| DL | Downlink |
| DRB | Data Radio Bearer |
| DRX | Discontinuous Reception |
| HARQ | Hybrid Automatic Repeat Request |
| IE | Information Element |
| LCH | Logical Channel |
| LCG | Logical Channel Group |
| LCP | Logical Channel Prioritization |
| MAC | Medium Access Control |
| MIB | Master Information Block |
| MSG | Message |
| NAS | Non-Access Stratum |
| NG-RAN | Next-Generation Radio Access Network |
| NR | New Radio |
| NW | Network |
| PCell | Primary Cell |
| PCCH | Paging Control Channel |
| PDCCH | Physical Downlink Control Channel |
| PDCP | Packet Data Convergence Protocol |
| PDU | Protocol Data Unit |
| PRACH | Physical Random Access Channel |
| PUCCH | Physical Uplink Control Channel |
| PUSCH | Physical Uplink Shared Channel |
| PLMN | Public Land Mobile Network |
| QoS | Quality of Service |
| RA | Random Access |
| RACH | Random Access Channel |
| RAN | Radio Access Network |

| Acronym | Full name |
| --- | --- |
| RB | Radio Bearer |
| Rel | Release |
| RLC | Radio Link Control |
| RNA | RAN-based Notification Area |
| RNTI | Radio Network Temporary Identifier |
| RRC | Radio Resource Control |
| RSRP | Reference Signal Receiving Power |
| SCell | Secondary Cell |
| SCG | Secondary Cell Group |
| SCS | Sub Carrier Spacing |
| SDT | Small Data Transmission |
| SDU | Service Data Unit |
| SFN | System Frame Number |
| SI | System Information |
| SIB | System Information Block |
| SINR | Signal to Interference plus Noise Ratio |
| SLIV | Start and Length Indicator |
| SNPN | Stand-alone Non-Public Network |
| SR | Scheduling Request |
| SRB | Signaling Radio Bearer |
| SSB | Synchronization Signal Block |
| S-TMSI | SAE-Temporary Mobile Subscriber Identity |
| SUL | Supplementary Uplink |
| TA | Timing Advance or Time Alignment |
| TAG | Timing Advance Group |
| TS | Technical Specification |
| UE | User Equipment |
| UL | Uplink |
| UPF | User Plane Function |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

As described above, since the amount of data associated with a system information block (SIB), such as SIB12, SIB13, SIB14, etc., may not fit into one system information message (e.g., sent via one or more control signaling(s) during one system information window time period), one or more serving cells (e.g., associated with one or more base stations) may divide the SIB data into different segments and transmit these segments to one or more UEs via system information delivery. The serving cell(s) may also broadcast other information (e.g., parameters) associated with a SIB segment, such as the segment number, segment type (e.g., an indicator, such as the parameter LastSegment or NotLastSegment), etc., that identify the corresponding segment, to the UEs via the SIB segments delivery. Based on this information, the UE may assemble a complete target SIB. A UE may, however, need to check the validity of each received segment before storing the received segment (e.g., and before assembling the target SIB from the stored segments).

Therefore, some of the present implementations provide a SIB segment management mechanism for a UE to determine whether to discard, maintain, and/or update each received SIB segment before the UE assembles a corresponding target SIB (e.g., a V2X-SIB) based on the stored SIB segments. In some implementations, a UE may perform a SIB segmentation validity check procedure before the UE assembles the complete target SIB successfully. In some implementations, the UE may leverage the information (e.g., parameters) associated with the SIB segments and broadcast by the serving cell(s) to perform the SIB segmentation validity check procedure. In some implementations, a UE may use a target service (e.g., a (E-UTRA) V2X communication service, NR sidelink communication service, an NR multi-cast broadcast service, a (NR) positioning service (e.g., via (NR) Uu interface and/or (NR) PC5 interface), etc.) after a successful assembly of a corresponding target service form the stored associated SIB segments.

It should be noted that even though the mechanisms described above and below for the management of SIB segmentation are mostly described with regard to NR, the described mechanisms may be equally applicable to other Radio Access Technologies (RATs), such as LTE, Narrow Band Internet-of-Things (NB-IoT), New Radio Non-Terrestrial-Network (NR NTN).

In some of the present implementations, the SIB signaling may include identical data that are transmitted by more than one cell in the RAN. As such, in some implementations, a cell may further indicate that a SIB signaling (e.g., a V2X-SIB) may be area-specific. The cell may make such an indication by configuring a particular parameter, such as an area scope parameter (e.g., areaScope), associated with the SIB (e.g., set the parameter areaScope=true). In addition, a system information area ID parameter (e.g., systeminformationAreaID) may be configured (e.g., to the UE) to be associated with the SIB. As a result, the UE may be able to determine whether the stored SIB is still valid (e.g., to the serving cell) by checking these parameters (e.g., valuetag, areaScope and systeminformationAreaID) received from the serving cell(s) after (or during) a cell (re)selection procedure.

The requirements described herein for a cell (re)selection operation may be applied in a UE in an LTE/NR_RRC_INACTIVE, RRC_IDLE and/or RRC_CONNECTED state. As such, such different states are described below first.

FIG. 1 is an RRC state transition diagram illustrating various RRC states and RRC transition procedures that a UE may undergo within a next generation radio access network, according to an exemplary implementation of the present application. The RRC state transition diagram 100 may include RRC_CONNECTED state 110, RRC_INACTIVE state 120, and RRC_IDLE state 130. In some implementations, the RRC Connected, RRC Inactive, and RRC Idle states may be three RRC states independent of one another. As shown in FIG. 1, a UE may transition among the three RRC states. The proposed mechanism may be applied to the UE during a target SIB reception procedure independent of the UE's RRC state (e.g., RRC_CONNECTED state, RRC_INACTIVE state, and RRC_IDLE state). In addition, the proposed mechanisms may also be applicable to UEs without being impacted by the state transitions between the RRC states.

For example, a UE may transition to RRC_INACTIVE state 120 from RRC_CONNECTED state 110 or may transition from RRC_INACTIVE state 120 to any of RRC_CONNECTED state 110 or RRC_IDLE state 130. However, as shown in RRC state transition diagram 100, a UE may not transition directly from RRC Idle state 130 to RRC Inactive state 120 in some implementations. That is, a UE may transition to RRC Inactive state 120 from RRC Idle state 130 through RRC Connected state 110 in some such implementations. In some aspects of the present implementations, a UE may also transition from RRC Connected state 110 to RRC Inactive state 120 using an RRC Suspend (or RRC Release with Suspend (configuration)) procedure. Conversely, the UE may transition from RRC Inactive state 120 to RRC Connected state 110 using an RRC (Connection) Resume procedure. Additionally, the UE may use an RRC Release procedure to transition from RRC Connected state 110 to RRC Inactive state 120 or RRC Idle state 130, while using an RRC Establish procedure to transition from RRC Idle state 130 to RRC Connected state 110.

In some implementations, in an RRC_INACTIVE state, a UE may remain as Connection Management (CM)-CONNECTED (e.g., where the UE has signaling connection with AMF) and may move within an area configured by the NG-RAN (e.g., RNA) without notifying the NG-RAN. In the RRC_INACTIVE state, the last serving cell (e.g., associated with a gNB) and the UE itself may keep the UE context (e.g., the UE (Inactive) Access Stratum (AS) context of the UE) and the UE-associated NG connection with the serving AMF and UPF.

In some implementations, the RRC_INACTIVE state may support various functions and/or characteristics, such as, small data transmission (SDT), PLMN selection, SNPN selection, broadcast of system information, cell re-selection mobility, paging initiated by NG-RAN (RAN paging), RAN-based notification area (RNA) managed by NG-RAN, DRX for RAN paging configured by NG-RAN, 5GC-NG-RAN connection (e.g., both control/user (C/U)-planes) established for the UE, UE AS context stored in NG-RAN and the UE, NG-RAN determining the RNA to which the UE belongs, etc. In some implementations, for NR connected to 5GC network, a UE's identity (e.g., full I-RNTI and/or short I-RNTI) may be used to identify the UE context (and the anchor cell/BS which stores the UE context) in the RRC_INACTIVE state. The I-RNTI may provide the new NG-RAN node with a reference to the UE context corresponding the old NG-RAN node.

How the new NG-RAN node is able to resolve the old NG-RAN ID from the I-RNTI is a matter of proper configuration in the old and new NG-RAN nodes. Some typical partitioning of a 40-bit I-RNTI my include, but is not limited to, a UE specific reference, an NG-RAN node address index, PLMN-specific information, and SNPN-specific information. A UE specific reference may include a reference to the UE context within a logical NG-RAN node. An NG-RAN node address index may include information that identify the NG-RAN node that allocates the UE specific part. Network-specific information (e.g., PLMN-specific information or SNPN-specific information) may include information that support network sharing deployments, and provide an index to the PLMN ID part of the Global NG-RAN node identifier. SNPN may include a small network that is configured by an operator. Each SNPN may be identified by a unique SNPN identity (ID) (e.g., an identifier for an SNPN may be a combination of a PLMN ID and an NID). A configured grant configuration may be associated with an SNPN ID.

In some implementations, the AS Context for a UE in RRC_INACTIVE state may be stored when the (RRC) connection is suspended (e.g., when the UE is in an RRC_INACTIVE state) and may be restored/retrieved when the connection is resumed (e.g., when the UE transitions from the RRC_INACTIVE state to an RRC_CONNECTED state). The suspension of the RRC connection may be initiated by the network (e.g., the serving RAN). When the RRC connection is suspended, the UE may store the UE Inactive AS context (and any related configuration received from the network), and may transition to an RRC_INACTIVE state. If the UE is configured with SCG, the UE may release/suspend (all or part of) the SCG configuration upon initiating an RRC Connection Resume procedure. The RRC message to suspend the RRC connection may be integrity-protected and ciphered. Resumption from a suspended RRC connection may be initiated by upper layers (e.g., NAS layer/RRC layer in the UE side) when the UE needs to transition from an RRC_INACTIVE state to an RRC_CONNECTED state, or by the RRC layer to perform an (event-triggered/periodical) RNA update, or by RAN paging, for example, from NG-RAN. When the RRC connection is resumed, the network may configure the UE according to the RRC connection resume procedure and based on the stored UE Inactive AS context (and any related RRC configuration received from the network). The RRC connection resume procedure may reactivate the AS security (and the NAS security) and reestablish the SRB(s) and DRB(s).

In some implementations, in response to a request to resume an RRC connection, the network may perform any of the following procedures. In some implementations, in response to such a request, the network may resume the suspended RRC connection and send the UE to an RRC_CONNECTED state, or may reject the request and send the UE to an RRC_INACTIVE state (e.g., with a wait timer). In some other implementations, the network may directly re-suspend the RRC connection in response to the request and send the UE to an RRC_INACTIVE state, or may directly release the (RRC) connection and send the UE to an RRC_IDLE mode. In yet other implementations, in response to a request to resume the RRC connection, the network (e.g., RAN or CN) may instruct the UE to initiate a NAS level recovery (e.g., by sending an RRC setup message to the UE). In some implementations, the UE may initiate a Tracking Area Update (e.g., by sending an RRC Resume Request message to the serving cell). In some other implementations, the UE may move to an RRC Idle state and then initiate an RRC establishment procedure after receive a CN paging from the serving RAN.

In addition, in the RRC_INACTIVE state, the upper layers (or the RRC layer) may configure a UE's specific DRX mechanism. The UE's controlled mobility may be based on the network configuration in the RRC_INACTIVE state, and the UE may store the UE Inactive AS context. Additionally, a RAN-based notification area may be configured by the RRC layer when the UE is in the RRC_INACTIVE state. Furthermore, the UE may perform other functions while in the RRC_INACTIVE state, such as monitoring paging DCI (e.g., that are transmitted by (scrambled) encoded with P-RNTI over DCI); monitoring a Paging channel for CN paging (e.g., using 5G-S-TMSI) and RAN paging (e.g., using full I-RNTI); performing neighboring cell measurements and cell (re-)selection; performing RAN-based notification area updates periodically and/or when moving outside the configured RAN-based notification area; and acquiring system information and sending SI request (e.g., if configured). In some other implementations, the UE may also need to monitor the short message, which is transmitted via the paging DCI, to monitor whether a system information update and/or a public warning service has been initiated, for example, by the serving cell.

In some aspects of the present implementations, when a UE (e.g., in an RRC_Connected state) attempts to make a communication (e.g., to perform an LTE/NR (V2X) sidelink communication, or a sidelink discovery announcement (e.g., via the (E-UTRA/NR) PC5 interface) on a non-serving frequency, the UE may perform measurements on that frequency for cell selection and/or intra-frequency reselection (e.g., in accordance with the 3GPP technical specification (TS) 38.133 or 38.304 v16.5.0). For example, when a UE is interested in performing a V2X sidelink communication on a non-serving frequency, the UE may perform measurements on that frequency or the frequencies on which inter-carrier V2X sidelink configuration for that frequency (e.g., for cell selection and/or intra-frequency reselection) is provided. If the UE detects at least one cell on the desired frequency on which the UE is configured to perform sidelink operations (e.g., upon fulfilling the S criterion in accordance with TS 36.304 v16.0.0 (or TS 38.304 v16.0.0)), the UE may consider itself to be in-coverage for sidelink operations on that frequency. Conversely, when the UE does not detect any cell on the desired frequency (e.g., that meets the S criterion), the UE may consider itself to be out-of-coverage for sidelink operations on that frequency. In this condition, the UE may implement sidelink operations based on stored sidelink pre-configuration (e.g., which may be pre-installed in the memory module of the UE) on the non-serving frequency carrier while the UE is considered out-of-coverage on the non-serving frequency carrier.

In some implementations, when a UE selects a cell on a non-serving frequency for sidelink communication (or V2X sidelink communication or sidelink discovery announcement), the UE may perform additional intra-frequency cell reselection process(es) to select a better cell for sidelink operations on that frequency (e.g., in accordance with TS 36.304 v16.0.0 (or TS 38.304 v16.0.0)).

In some implementations, a UE may consider a carrier to be preconfigured for sidelink communication (or V2X sidelink communication), or the frequencies to be preconfigured for providing inter-carrier V2X sidelink configuration to have the highest cell reselection priority (e.g., in accordance with TS 36.304 v16.0.0 (or TS 38.304 v16.0.0)).

In some implementations, when the frequency on which the UE is configured to perform sidelink communication is a serving frequency, the UE may use the serving cell (e.g., the priminary cell) on that frequency for the sidelink operation.

As described above, a UE may be able to determine whether a stored target SIB is still valid (e.g., to the serving cell) by checking one or more parameters (e.g., valueTag, areaScope, systeminformationAreaID, etc.) received from the serving cell after (or during) a cell (re)selection procedure. In some of the present implementations, two or more cells within the same configured area (e.g., which provides the same V2X-SIB and/or provides the same systeminformationAreaID that are associated with the V2X-SIB) may also be segmented similarly. That is, the target SIB may be segmented into the same pieces and then identical SIB segments may be transmitted/broadcast by the cells that are within the same configured area. For example, the SIB segments that (i) are broadcast by the cells within the same configured area and (ii) have the same segmentNumber, may contain identical information in some such implementations.

In some implementations, each cell (e.g., among the cells that are within the same configured area) may be capable of delivering the SIB segments in a different manner. For example, one or more cells (e.g., within the same system information area) may broadcast the SIB segments (e.g., continuously), while one or more other cells may broadcast the SIB segments after receiving a SIB request message from one or more UEs (e.g., through a 2-step random access procedure or a 4-step random access procedure). Yet, one or more other cells may transmit the SIB segments to the UE(s), for example, through UE-specific dedicated control signaling (e.g., via an RRCReconfiguration message).

In the initiation phase (e.g., when the UE receives SIB1), in some implementations, if neither the SIB segment nor the current value of a particular parameter (e.g., valueTag, areascope, and/or systemInformationareaID, which the UE may obtain via SIB1 reception form the serving cell on the serving frequency carrier or from the selected (non-serving) cell on the non-serving frequency carrier) of the target SIB are stored in the UE side, the UE may store the SIB segment(s) and the received values (or parameters/enumerators) from the current received downlink control signaling (e.g., the systeminformationblockType1, SIB1, etc.) from the serving cell or the camped cell/selected cell. In other words, the UE may store at least one of the value tag parameter, the area scope parameter, and the system information area ID parameter if neither the SIB segment nor any of these parameters are stored during the initiation phase. In some implementations, the valueTag may be an integer within a (predefined) range, for example between 0 to 31. In some implementations, the areaScope indicator may be an enumerator (e.g., false, true), or alternatively, the received signaling may not transmit the areaScope in SIB1. The systemInformationAreaID, in some implementations, may be a bit string (e.g., having up to 24 bits), or alternatively, the systemInformationAreaID may not be present (e.g., in the received signaling).

In some other implementations, the Public Land Mobile Network (PLMN) may also be considered as supporting information in a SIB segmentation management. As such, at the initiation stage, the UE may also store the first PLMN-Identity in the PLMN-IdentityInfoList when the UE starts storing the SIB segments received from a serving cell. In some implementations, the UE may store the first NPN-Identity in the NPN-Identity/InfoList when the UE starts storing the SIB segments received from a serving cell (e.g., when the serving cell is a Non-Public Network (NPN)-only cell).

In some other implementations, a cell that is only available for normal service for the NPNs' subscribers may be referred to as an NPN-only cell. An NPN-capable UE may determine that a cell is an NPN-only cell by determining that the cellReservedForOtherUse IE is set to true (e.g., when the npn-IdentityInfoList IE is present in the CellAccessRelatedInfo). A non-NPN-only cell may include a cell that is not an NPN-only cell. In some implementations, the first NPN-identity may include a PLMN identity and/or a Network Identity (NID), which may be referred to as a standalone NPN (SNPN). The first NPN-identity may include a PLMN identity and/or a Cell Access Group (CAG) identity, which may be referred to as a PNI-Public Network Integrated (PNI-NPN).

In some aspects of the present implementations, a UE may need to check the validity of the stored SIB segments under some circumstances. For example, each time the UE receives a SIB segment (e.g., before the SIB segment could be assembled to a complete target SIB) the UE may perform a SIB segment validity check procedure. Checking the validity of the SIB segments may occur while the UE stays in the same coverage area (e.g., provided by the same cell, which may be identified by the UE via the cell identity (e.g., cellidentity) broadcast by each cell via the broadcasting system information) or it may occur while the UE moves from one coverage area (e.g., of a first cell) to another coverages area (e.g., of a second cell).

I. Under the Same Coverage Area of A Serving Cell

In some implementations, the UE may stay under the same coverage area of the same serving cell (e.g., on a selected frequency carrier) while collecting the SIB segments of a target SIB. In other words, the stored SIB segments and the stored information associated with the stored SIB segments may also be associated with the identity of the serving cell (e.g., the cellidentity parameter of the serving cell). A UE may obtain the parameter cellidentity from the serving cell by reading the broadcasting system information (e.g., received via SIB1). In some implementations, the UE (e.g., an RRC entity of the UE) may forward the cellidentity parameter to the upper layers (e.g., to Non-Access Stratum (NAS) layer) of the UE.

In some implementations, a UE may discard the stored SIB segments if one or more of the following conditions are met. For example, if the received value of the valueTag parameter associated with the SIB segment is different from the current stored (or configured) value of the valueTag parameter for the corresponding SIB (e.g., V2X-SIB), the UE may discard (e.g., remove/release from storage) the stored SIB segments (e.g., SIB segments that have the initial valueTag value). In some other implementations, instead of, or in conjunction with, the value tag, if the value of the areascope parameter (e.g., whether present or not present) and/or the value of the systemInformationAreaID parameter (e.g., whether present or not present) from the latest DL control signaling (e.g., SIB1) are different from the currently stored values of the areaScope and/or systemInformation-AreaID parameters for the associated SIB (e.g., V2X-SIB), the UE may discard the currently stored SIB segments.

For example, a UE may initially store a valueTag that is associated with one or more received SIB segments. Subsequently, the UE may receive a different valueTag that is associated with the same target SIB from the UE's serving cell. The value tag of the same target SIB may change for different reasons. For example, the value tag may change when the serving cell modifies the target SIB before the UE is able to assemble a complete target SIB based on the stored SIB segments (e.g., while the UE is receiving the SIB segments and the valueTag(s) from the same serving cell). In some implementations, the received valueTag may be larger than the stored valueTag or may be smaller than the stored valueTag. Nevertheless, when the received value tags are different, the UE may discard (e.g., remove or release from memory) all of the previously stored SIB segments and then store the latest SIB segments (e.g., all of which are associated with the newly received value tag) received from its serving cell. It should be noted that, even though the other parameters, such as the areaScope and/or the systemInformationAreaID may also be updated when the value tag is updated, the UE may discard the stored SIB segments irrespective of the changes in these parameters (e.g., the UE may not check to determine whether the values of these additional parameters have also been changed).

Figure 2A:
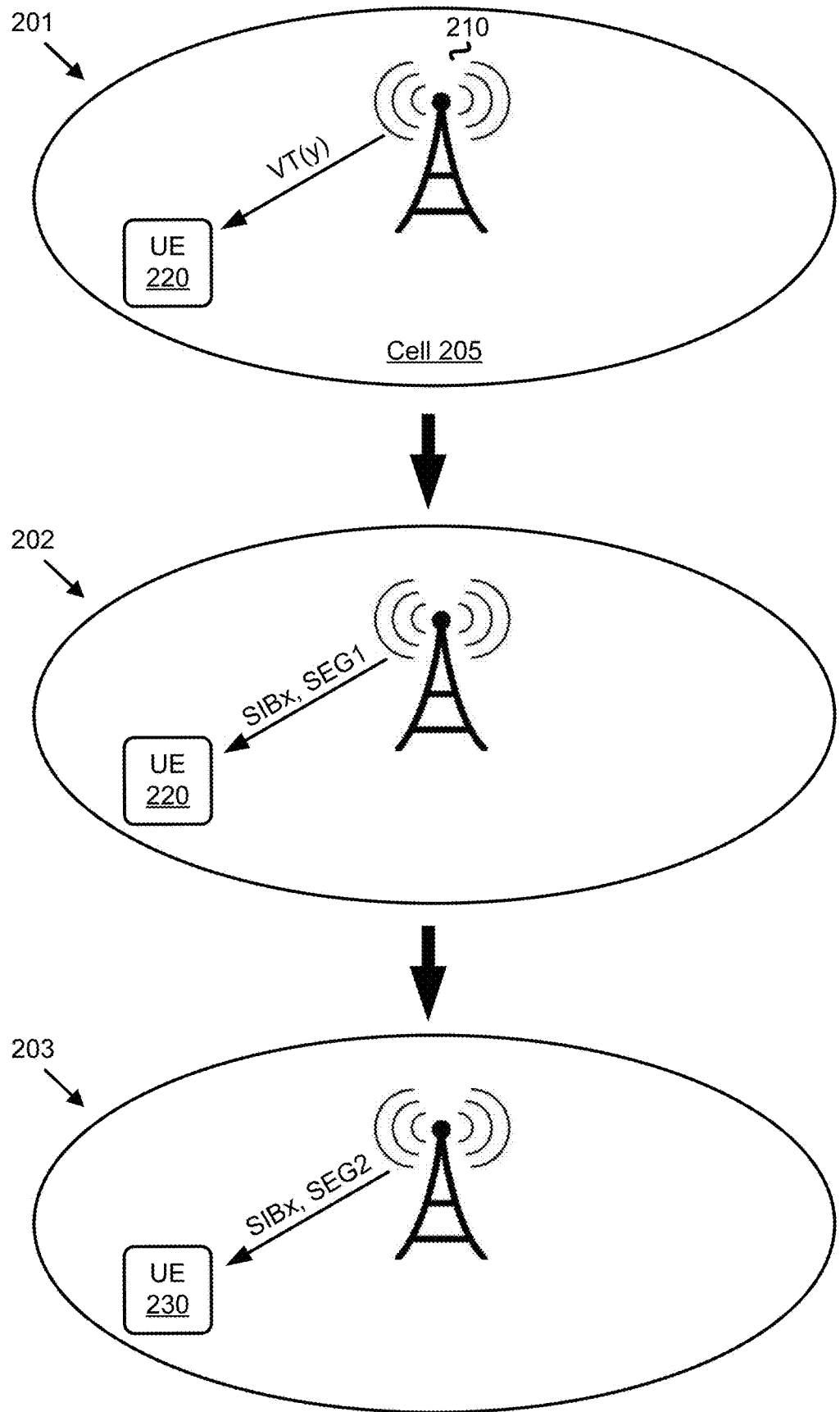
FIGS. 2A-2B are diagrams illustrating the transmission of different value tags and system information block (SIB) segments associated with a target SIB from a base station to a UE, according to an example implementation of the present application.
Figure 2B:
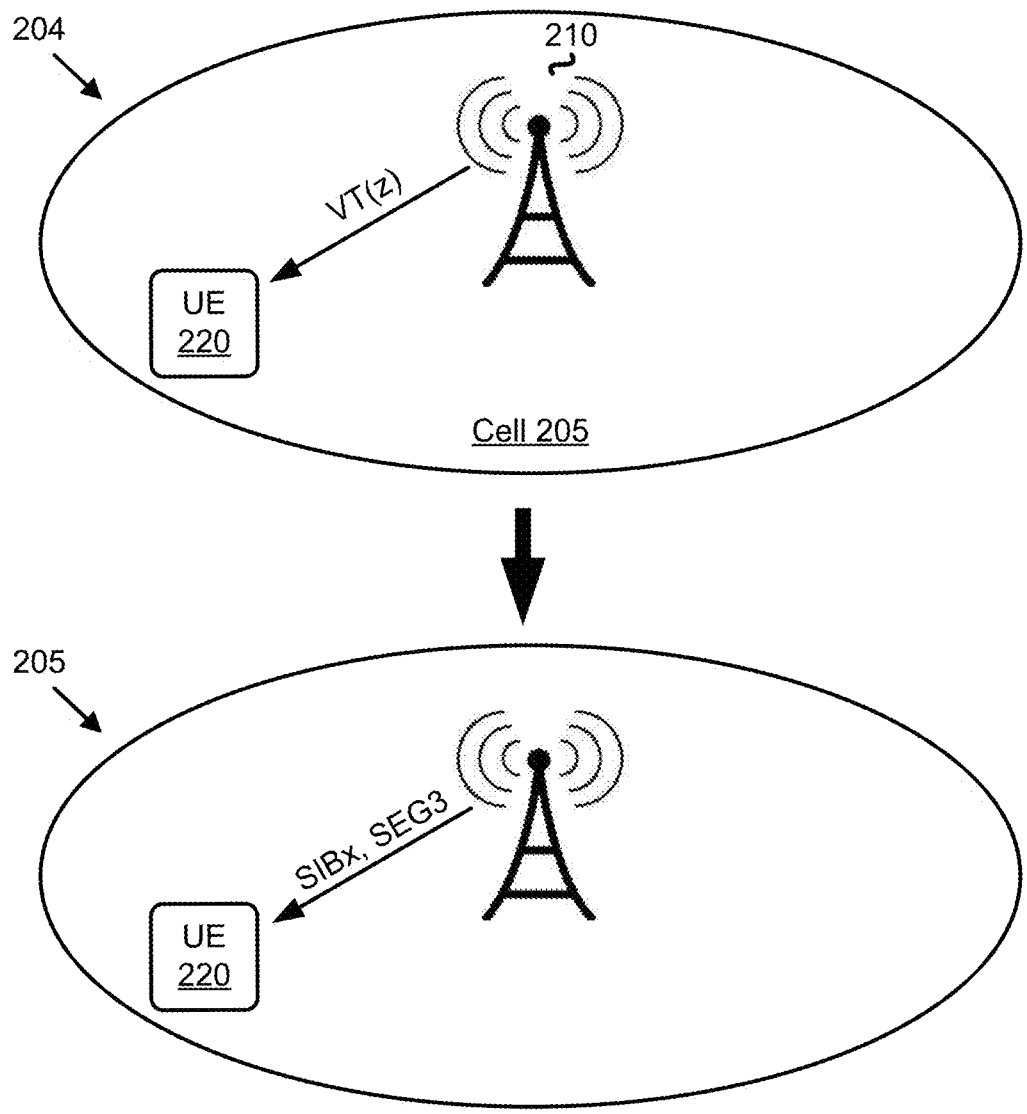

FIGS. 2A-2B are diagrams illustrating the transmission of different value tags and SIB segments associated with a target SIB from a base station to a UE, according to an example implementation of the present application. More specifically, FIGS. 2A-2B illustrate, in five different operational stages 201-205, how base station 210 (or cell 205 associated with base station 210) may transmit two value tags (e.g., value tag (y) and value tag (z)) and three different segments associated with SIBx (e.g., SIB12) to UE 220, and how UE 220 may perform a SIB segmentation validity check process to determine the validity of the received SIB segments.

In stage 201, UE 220 may receive (or be configured with) a first value tag (e.g., value tag (y), VT(y)) by base station 210. The first value tag (y) may be associated with target SIBx. The UE may receive this value tag/areaScope/systemInformationAreaID from the base station through DL control signaling (e.g., through RRC signaling, such as RRCReconfiguration message with the information element 'dedicatedSIB1-Delivery', which is configured to transmit SIB1 to the UE via UE-specific RRC signaling). Please also note this field has the same values as the corresponding configuration in the broadcasting SIB1) or through SI broadcasting (e.g., SIB1).

In stage 202, base station 210 (or cell 205) may transmit (e.g., broadcast) the first SIB segment of the SIBx (e.g., SIBx, SEG1). UE 220 may determine that since there is no stored SIB segment for this target SIB and since the value tag of this segment is still valid (e.g., VT(y)), the first SIB segment (e.g., SEG1) is valid and therefore may store this SIB segment (e.g., in a memory of the UE). Next, in stage 203, base station 210 may transmit the second SIB segment of the SIBx (e.g., SIBx, SEG2). UE 220 may determine that since the value tag of this second SIB segment is the same as the value tag associated with the stored SIB segment (e.g., it is still VT(y)), the second SIB segment (e.g., SEG2) is also valid and therefore may store this second SIB segment in the memory of the UE as well.

In stage 204 of FIG. 2B, UE 220 may receive (or be configured with) a second value tag (e.g., value tag (z), VT(z)) by base station 210. The second value tag (z) may also be associated with target SIBx (e.g., the value tag may change because the SIB version may have been updated by this time). UE 220 may receive this new value tag from the base station through DL control signaling (e.g., through RRC signaling) or through SI broadcasting (e.g., SIB1).

Next, in stage 205, base station 210 may transmit a third SIB segment of the SIBx (e.g., SIBx, SEG3). At this stage, however, UE 220 of some implementations may determine that the value tag associated with this third SIB segment (e.g., VT(z)) is not the same as the value tag associated with the currently stored SIB segment (e.g., VT(y)). As such, in some implementations, UE 220 may discard the stored SIB segments (e.g., SEG1 and SEG2) by removing them from its memory, and may instead, store the received third SIB segment (e.g., SEG3) in the memory of the UE (e.g., and any subsequently received SIB segment that is associated with the same value tag, e.g., VT(z)).

In some implementations, a UE may also store the parameters {areaScope=true} and {systemInformationAreaID} associated with the stored SIB segments. Thereafter, the UE may receive a different {systemInformationAreaID} from the serving cell. Under such a circumstance, the UE may discard all of the stored SIB segments and store the latest SIB segments received from its serving cell. It should be noted that in this condition, the {valueTag} associated with the obtained (or new) SIB segments may (or may not) be updated by the UE based on the latest DL control signaling.

In some implementations, a UE may store the parameters {areaScope=true} and {systemInformationAreaID} associated with the stored SIB segments. However, the UE may not later receive {areaScope=true} from the serving cell (e.g., the areaScope may not be present in the received signaling from the serving cell/selected cell or the areaScope is re-configured as {areaScope=false} by the serving cell/selected cell). In this condition, the UE may discard all the stored SIB segments and may store the latest SIB segments received from its serving cell. It should be noted that in this condition, the {valueTag} associated with the obtained (or new) SIB segments may (or may not) be updated by the UE based on the latest DL control signaling.

In some implementations, when the parameter {areaScope} is not present, it means that the stored SIB segments received from the original serving cell are not area-specific and, as such, the UE may not store any {systemInformationAreaID} parameters associated with the stored SIB segments. Although the parameter {areaScope} may not be present, the UE may still receive the parameter {areaScope=true} with a {systemInformationAreaID}, for example, from the latest DL control signaling. If this happens, the UE may discard all the stored SIB segments and may store the latest SIB segment(s) received from its serving cell. It should be noted that under this condition, the parameter {valueTag} associated with the obtained (or newly received) SIB segments may (or may not) be updated by the UE based on the latest DL control signaling.

In some implementations, a UE may (re)select a serving/selected cell (e.g., such that the cellidentity parameter received from the new serving/selected cell may be different from the stored cellidentity parameter associated with the stored SIB segments) on a target frequency associated with a specific service (e.g., V2X-service) and the parameter {areaScope} may not be present in the stored SIB segments. Under such a circumstance, the UE may discard all of the stored SIB segments with their corresponding stored {PLMN-Identity or NPN-Identity}, {valueTag}, {areaScope} (if present), and {systemInformationAreaID} (if present) associated with the stored SIB segments. The UE may then try to reobtain/store the SIB (or SIB segments) associated with the target service (e.g., V2X-SIB) received from the new serving cell.

It should be noted that the serving/selected cell for the target service, in some implementations, may not be the Primary Cell or the Primary Secondary Cell or the Secondary Cell of the UE. Moreover, the serving cell/selected may not be the cell the UE may maintain and/or with which the UE may initiate an RRC Connection in the serving RAN.

In some implementations, after collecting and storing all the SIB segments associated with a target SIB successfully, the UE may start assembling the complete target SIB. After assembling the target SIB, in some of the present implementations, the UE may also remap the stored parameters, such as the {valueTag}, {areaScope} (if present), {systemInformationAreaID} (if present), cellidentity, and/or {PLMN-Identity or NPN-Identity} to be associated with the assembled target SIB.

In some implementations, the UE may not consider the stored SIB segments as a valid version associated with the target SIB before the UE assembles the complete target SIB based on the stored SIB segments. As such, before the UE assembles the complete target SIB, the UE may still be allowed to request the target SIB through, for example, a random access procedure (2-step and/or 4-step random access procedure). Moreover, for an RRC Connected UE, the UE may be allowed to request the target SIB through UE-specific control signaling (e.g., based on the configuration received from a serving cell), such as a DedicatedSIBRequest message. In some other implementations, the UE may not (be allowed to) request the target SIB through UE-specific signaling (e.g., via a DedicatedSIBRequest message) when the UE has stored one or more (valid) SIB segments associated with the target SIB.

II. Under the Coverage Area of Multiple Cells

Some aspects of the present implementations may further identify the UE and/or RAN behaviour during (or after) a cell reselection process and when the stored SIB segments are associated with a specific systemInformationAreaID. Under such circumstances, in some implementations, the UE may store and assemble the SIB segments received from different cells if the same SIB (e.g., and the same SIB segmentation approach) is used within the cells (e.g., that provide the same systemInformationAreaID in the DL control signaling for the target SIB).

In some implementations, a UE may keep the stored SIB segments after a cell (re)selection procedure (or when an intra-frequency/inter-frequency/inter-RAT/inter-system cell (re)selection procedure) is triggered for the target service (e.g., V2X service). The UE, in some such implementations, may check the validity of SIB segments after the cell (re)selection procedure (or upon the reception of SIB1/SIB segments from the (intra-frequency/inter-frequency/inter-RAT/inter-system) neighbouring/target cell).

In some implementations, after receiving a new SIB segment, a UE may determine that the stored SIB segments are still valid if the associated {areaScope} of the stored segments is stored, and the ({valueTag}, {systemInformationAreaID}) of the stored SIB segments are the same as the ({valueTag}, {systemInformationAreaID}) of the received SIB segment. The UE may receive the system information from the serving (or target/neighbouring or newly selected) cell (e.g., by reading the si-SchedulingInfo of SIB1, which is broadcast by the serving (or target/neighbouring or newly selected) cell).

Additionally, the UE may try to receive other SIB segments by monitoring the broadcasting system information from the newly selected serving cell. In such a case, the UE may assemble the complete target SIB by combining the SIB segments received from two or more selected (serving) cells.

Conversely, a UE may discard the stored SIB segments (and the stored information associated with the stored SIB segments) if the UE determines that the stored SIB segments are invalid for the current serving cell. For example, if the ({valueTag}, {areaScope}, {systemInformationAreaID}) of the stored SIB segments are not the same as the ({valueTag}, {areaScope}, {systemInformationAreaID}) of the received system information, the UE may discard the stored SIB segments and subsequently store the SIB segments (and the information associated with the stored SIB segments) received from the newly selected serving cell.

In some implementations, the PLMN may also be included as part of the information of the area-specific SIB segments. In some such implementations, the UE may also record the SIB segments to be associated with the parameter PLMN-Identity, which may also be provided by the same serving cell that broadcasts the SIB segments.

During a SIB segmentation validity check procedure, a UE may determine that the stored SIB segments are still valid (e.g., for a serving cell) if the serving cell is a non-NPN-only cell and the first PLMN-identity included in the PLMN-IdentityInfoList is identical to the PLMN-Identity associated with the stored SIB segments, and the {valueTag} and {systemInformationAreaID} provided by the serving cell are also the same as the {valueTag} and {systemInformationAreaID} associated with the stored SIB segments.

Additionally, if the serving cell is a NPN-only cell and the first NPN-Identity included in the NPN-IdentityInfoList is identical to the NPN-Identity associated with the stored SIB segments, and the {valueTag}, {areaScope} (e.g., present/not present) and {systemInformationAreaID} provided by the serving cell are also the same as the {valueTag}, {areaScope} (e.g., present/not present) and {systemInformationAreaID} associated with the stored SIB segments, the UE may determine that the stored SIB segments are valid for the cell.

As such, under these circumstances, the UE may assemble the complete target SIB by combining the SIB segments received from more than one selected serving cells and stored in the UE. Otherwise, the UE may discard the stored SIB segments (and the stored information associated with the stored SIB segments) if the UE determines that the stored SIB segments are invalid (e.g., for the serving cell). When the UE determines that the SIB segments stored at the UE are not valid, the UE may reobtain/store the SIB segments (and the information associated with the stored SIB segments) received from the newly selected serving cell.

Figure 3A:
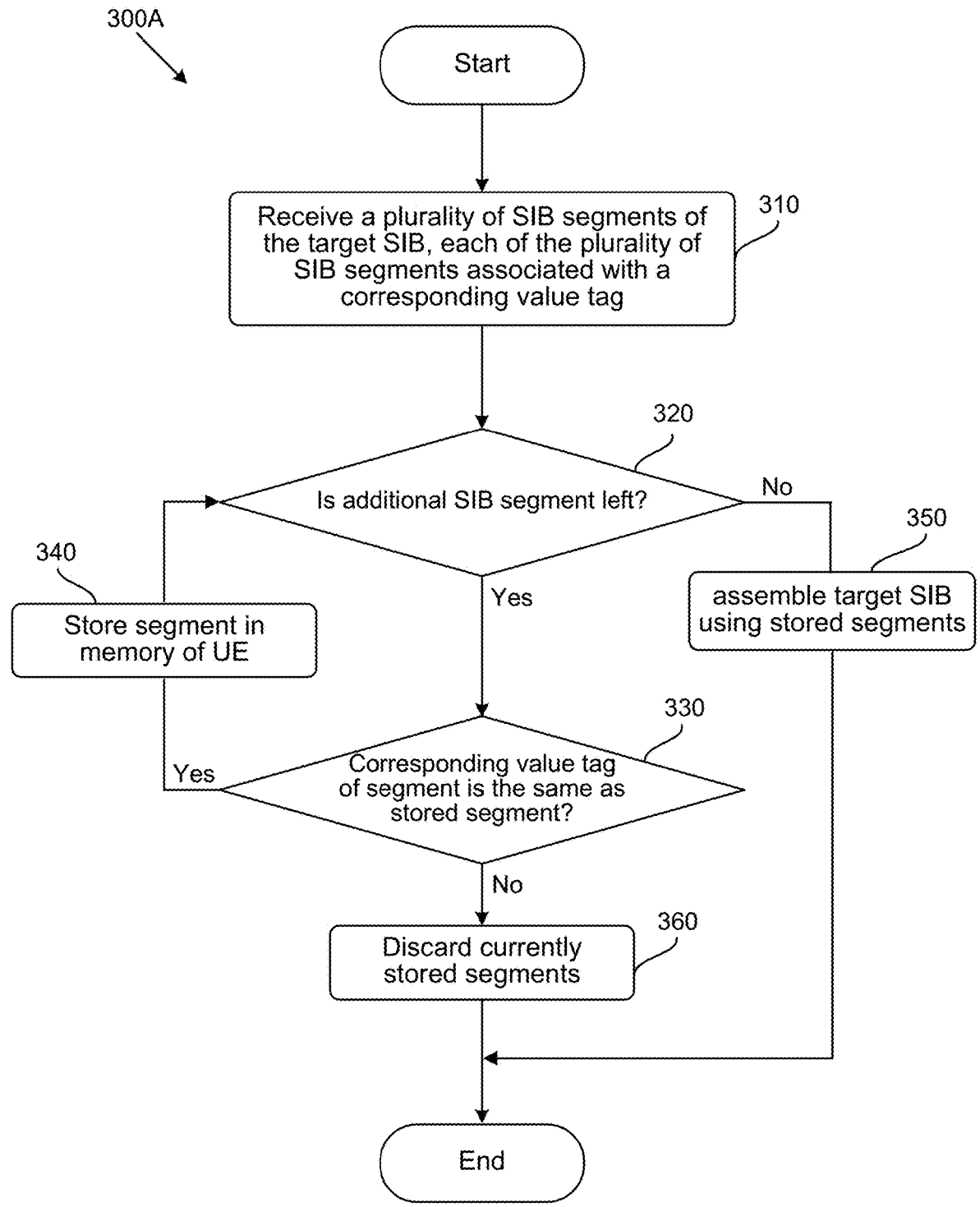
FIG. 3A is a flowchart illustrating a method (or process) performed by a UE to assemble a target SIB for a target service after a successful reception of the different SIB segments of the target SIB from one or more serving cells, according to an example implementation of the present application.

FIG. 3A is a flowchart illustrating a method (or process) 300A performed by a UE to assemble a target SIB for a target service after successfully receiving the different SIB segments of the target SIB from one or more serving cells and storing the SIB segments, according to an example implementation of the present application.

Process 300A may start, at 310, by receiving, for example, from a first cell on a first frequency carrier, a plurality of SIB segments of a target SIB. As described above, each of the plurality of SIB segments may be associated with a corresponding value tag (previously) configured to the UE in some implementations.

Process 300A may then determine, at 320, whether any additional SIB segments (e.g., in the plurality of SIB segments) is left to be processed. For the first time the process is performed, since there is at least one more segment (e.g., the first SIB segment) is left to be processed, the process may determine that (at least) a (SIB) segment is left and may proceed to action 330. In action 330 process 300A may determine whether a corresponding value tag of the currently processed SIB segment is the same as the corresponding value tag of the first SIB segment. Again, when the processed is performed for the first time, the value tag of the currently processed segment (e.g., the first segment) is the same as the value tag corresponding to the first SIB segment. As such, the process may store, at 340, the currently processed SIB segment(s), for example, in a memory of the UE. Process 300A may then return to action 320 to determine whether any additional SIB segment is left to be processed.

In case all the processed segments have the same value tag, as the first SIB segment, and the last SIB segment has been processed successfully too, process 300A may proceed to action 350 to assemble the target SIB using the stored plurality of SIB segments. However, if for any of the processed segments before reaching the end of the plurality of segments, process 300A determines, at 330, that the value tag associated with the currently processed SIB segment is different than the value tag associated with the first SIB segment, the process may discard, at 360, the currently stored segments. For example, the process may remove all the stored SIB segments from the memory and start storing any new SIB segment that is associated with the new value tag. The process may then end.

In some implementations, if during a SIB segmentation validity check process (e.g., while the UE is storing the SIB segments of a target SIB), the UE moves from the current serving cell to a second cell (e.g., by (re)selecting the second cell), irrespective of the second cell being on the same frequency carrier of the first cell or not, the UE may drop all the stored SIB segments upon selection of the second cell. In some implementations, the first frequency carrier of the first cell may include a serving frequency carrier for the UE, and the first cell and the second selected cell may include serving cells of the UE. In some other implementations, the first frequency carrier may include a non-serving frequency carrier for the UE, and the first cell and the second cell may not be the serving cells of the UE.

In some implementations, when the corresponding value tag of a currently processed SIB segment is not the same as the corresponding value tag of the first SIB segment, process 300A may store the currently processed SIB segment in the memory of the UE and may remove the first SIB segment and all previously stored SIB segments that have the same value tag as the first SIB segment from the memory.

In some implementations, after assembling the target SIB successfully, process 300A may configure a validity area of the target SIB with a first area identification (ID) if the target SIB is associated with a first areascope information element (IE) (e.g., when both the first areascope IE and the first area ID are broadcast by the first cell). Process 300A may then select a second cell on the first frequency carrier, the second cell broadcasting a second area scope IE and a second area ID associated with a second SIB which is configured by the second cell to support the same target service. The process may then determine that the stored target SIB is still valid during the selection of the second cell if the second area ID is the same as the first area ID associated with the target SIB. In some such implementations, process 300A may select a third cell on the first frequency carrier, where the third cell broadcasts a third area ID, which is different from the first area ID associated with the target SIB, and may determine that the target SIB is not valid during the selection of the third cell.

In some implementations, process 300A may select a third cell on the first frequency carrier, where the third cell does not broadcast any SIB related information that supports the same target service, or the third cell broadcasts data associated with a third SIB that supports the same target service but does not have an associated areascope IE. The process may then determine that the stored target SIB is not valid during the selection of the third cell. It should also be noted that, in some implementations, it may be UE's decision/implementation on whether to drop/remove or keep/retain an invalid target SIB (and the associated cell/system information area).

In some implementations, after assembling the target SIB successfully, process 300A may configure a validity area (e.g., the downlink coverage of a serving/selected first cell) associated with the target SIB on the UE if the target SIB is not associated with any areascope information element (IE) sent by the first cell.

In some implementations, the target service my include a new radio (NR) sidelink communication service and the target SIB may include an NR sidelink radio configuration. In some such implementations, after reselecting another cell on the first frequency carrier, process 300A may implement the NR sidelink communication service based on the NR sidelink radio configuration in the stored target SIB if the stored target SIB is determined to be valid on the reselected cell. In contrast, the process 300A may also include the UE implementations of stopping NR sidelink communication service based on the NR sidelink radio configuration in the stored SIB if the stored target SIB is determined to be invalid on the reselected cell.

Figure 3B:
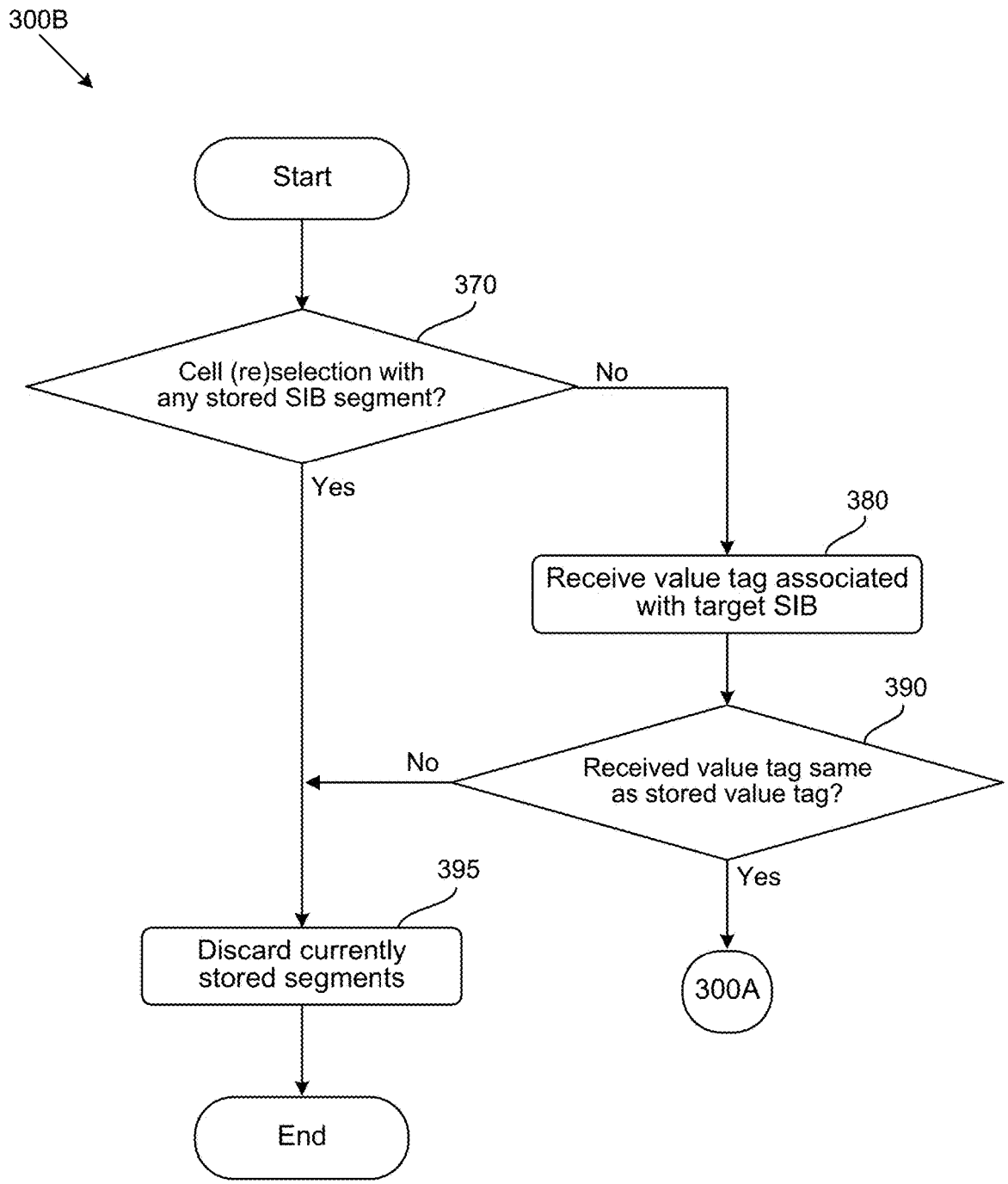
FIG. 3B is a flowchart illustrating a method (or process) performed by a UE to assemble a target SIB for a target service after a cell (re)selection, according to an example implementation of the present application.

FIG. 3B is a flowchart illustrating a method (or process) 300B performed by a UE to assemble a target SIB for a target service after a cell (re)selection, according to an example implementation of the present application.

Process 300B may check the validity of the stored SIB segments (if there is any) by first determining, in action 370, whether a cell selection or cell re-selection procedure has been triggered by the UE while the UE has previously stored one or more SIB segments. Such a determination may be made before the target SIB is assembled by the UE successfully. Then, after action 310, the process may discard, at 395, the stored SIB segments if process 300B determines that a cell selection/cell re-selection procedure has been triggered, for example, during a SIB segment reception procedure and the UE has already stored at least one SIB segment from a plurality of first SIB segments of the target SIB. In contrast, the UE may keep monitoring the value tag associated with the target SIB/SIB segments (e.g., via receiving the SIB1 from the serving cell). For example, in action 380, process 300B may receive a value tag associated with the target SIB or the target SIB segment(s) when the UE is staying at the same serving cell during the SIB segments reception procedure or the UE has just started receiving the SIB segment(s) of the target SIB (e.g., when the UE has not stored any SIB segment of the target SIB yet).

In action 390, process 300B may determine whether a corresponding value tag (e.g., which is transmitted via the currently received SIB1 of the serving cell) of the target SIB/SIB segments is the same as the corresponding value tag of the stored SIB segment(s). Again, when the process 300B is performed for the first time, the UE may store the value tag of the target SIB/SIB segment(s) (e.g., which the UE receives via the currently received SIB1), for example, in a memory of the UE as the value tag of the SIB segment(s). Process 300B may then execute process 300A to receive new SIB segments if process 300B determines that the value tag of the currently received target SIB information (in the currently received SIB1) is the same as the value tag corresponding to the stored SIB segment(s) and additional SIB segments are left to be received. During executing process 300A, the UE may try to decode and obtain the additional SIB segments during a System Information (SI) window time period configured by the serving/non-serving/selected cell (e.g., the SI window configuration may have also been transmitted in the SIB1). As described above with reference to process 300A, for the first time the process is implemented, the UE may receive and store a first SIB segment in the memory module of UE. Then, the UE may check to see whether all of the SIB segments for the target SIB have been received by the UE while checking whether the value tag, during the SIB segment reception and before successfully receiving all of the segments, is changed. The actions UE may take next are described above with reference to FIG. 3A. It should be noted that, in some implementations, the UE may skip action 330 and action 360 in process 300A if the UE has checked the value tag associated with the target SIB/SIB segments and the value tag associated with the stored (first) SIB segment(s) (e.g., the UE has implemented action 380 and action 390 in a running process 300B and then the process 300A is triggered after action 390). It should also be noted that, in this condition, in the running process 300A, the UE may directly store the received SIB segments in the action 320 of process 300A if there is still at least one target SIB segment left.

On the other hand, if process 300B determines that the received value tag is not the same as the currently stored (or configured) value tag of the UE, the process may proceed to action 395 to discard all the currently stored SIB segments of the target SIB. The process may then end. In some implementations, the UE may obtain the scheduling information for the target SIB (e.g., the SI window period of the target SIB/SIB segments) via SIB1.

In some implementations, if during a SIB segmentation validity check process (e.g., while the UE is storing any SIB segments of a target SIB), the UE moves from the current serving cell to a second cell (e.g., by (re)selecting the second cell) in the same frequency carrier or different frequency carriers (e.g., intra-frequency cell (re)selection or inter-frequency cell (re)selection), irrespective of the frequency carrier is a serving frequency carrier or a non-serving frequency carrier to the UE, the UE may drop all the stored SIB segments upon selection of the second cell. In some implementations, the first frequency carrier of the first cell may include a serving frequency carrier for the UE, and the first cell and the second selected cell may include serving cells (e.g., primary cell, primary secondary cell, or secondary cell) of the UE. In some other implementations, the first frequency carrier may include a non-serving frequency carrier for the UE, and the first cell and the second cell may not be the serving cells of the UE.

In some implementations, as described above, after assembling the target SIB successfully, the UE may configure the downlink coverage of the first cell, which is the serving cell while the UE assembles the target SIB successfully, as the validity area associated with the target SIB on the UE if the target SIB is not associated with any areascope information element (IE) sent by the first cell.

In some implementations, as described above, the target service my include a new radio (NR) sidelink communication service and the target SIB may include an NR sidelink radio configuration. In some such implementations, after reselecting another cell on the first frequency carrier, the UE may implement the NR sidelink communication service based on the NR sidelink radio configuration in the stored target SIB if the stored target SIB is determined to be valid on the reselected cell. In some implementations, the NR sidelink radio configuration may include sidelink radio resource configuration (e.g., Type 1 sidelink configured grant configuration/Type 2 sidelink configured grant configuration/V2X-Semi-Persistent-Scheduling (V2X-SPS) configuration/Sidelink Transmission resource pool configuration/Sidelink Reception resource pool configurations/sidelink exceptional resource pool configuration), which may be configured with (at least) one sidelink Bandwidth Part (SL-BWP) on the operation frequency carrier (e.g., the first frequency carrier) and/or other sidelink frequency carrier(s). In some implementations, the BWP-related configuration, such as subcarrier spacing (SCS) and/or cyclic prefix (CP) length associated with each SL-BWP, may also be included in the NR sidelink radio configuration. In some implementations, the NR sidelink radio configuration may also include sidelink synchronization/sidelink measurement configuration/sidelink sensing configuration (e.g., channel busy ratio (CBR) configuration). In some implementations, the NR sidelink radio configuration may also include a common configuration for sidelink radio bearer configurations/sidelink RLC bearer configurations/sidelink radio link failure configuration.

In some implementations, a cell may change the valueTag associated with a SIB when the cell changes or modifies the segmentations associated with the SIB (e.g., even when the complete SIB is still the same). In some implementations, a cell may also need to initiate a system information modification procedure to change the SIB segmentation procedure (e.g., even when the complete SIB is still the same). In some such implementations, when a UE receives an indication(s) of the SI modification procedure due to a change in the SIB segmentation procedure, the UE may discard all the stored SIB segments. Additionally, if the UE receives an indication (s) of the SI modification procedure due to the change of the SIB segmentation procedure, the UE may also discard the stored SIB segments related to the SIB which is to be modified.

In some implementations, the SI change indication described above may be transmitted by the cell in a paging message (e.g., via a short message, which may be broadcast by the serving cell via (at least) one paging Downlink Control Information (DCI) in (at least) one Physical Downlink Control Channel (PDCCH)) within one modification period (e.g., for system information change). In some implementations, the time span of an SI modification period may be decided based on a Discontinuous Reception Cycle (DRX cycle) (e.g., broadcast by the cell) and may not be applied to the SIB segmentation changes. In other words, in some implementations, the base statin may not set the SI change indication to be true (or set to be equal to 1) in the paging DCI/short message when the SIB segmentation approach changes, but the content of the SIB is still the same.

In some implementations, a cell may need not to initiate a system information modification procedure to change the SIB segmentation approach. Instead, the cell may change its valueTag directly and then deliver the SIB (e.g., V2X-SIB) with a different SIB segmentation approach. In this condition, the UE may be responsible to check the latest valueTagbefore the UE assembles a complete SIB from the stored SIB segments successfully.

In some implementations, a cell may not change its valueTag associated with the SIB when the cell changes the segmentation approach associated with a target SIB (e.g., even when the complete SIB is still the same). In some other implementations, a cell may change its valueTag associated with a target SIB when the cell changes the segmentation approach associated with the target SIB (e.g., even when the complete SIB is still the same). In some implementations, the cell may change the SIB delivery approach before the UE assembles the complete target SIB (e.g., V2X-SIB) successfully. For example, the cell may change its si-BroadcastStatus associated with the target SIB from {broadcasting} to {non-broadcasting} before the UE assembles the complete target SIB successfully. Under such a circumstance, the UE may still maintain the stored SIB segments and may then initiate (a 2-step or 4-step) random access procedure to request the target SIB again. Alternatively, the UE (e.g., in an RRC_CONNECTED state) may still maintain the stored SIB segments and then transmit an RRC message (e.g., a dedicatedSIBRequest message) to the serving cell to request the target SIB. Upon the transmission of the RRC message (e.g., the dedicatedSIBRequest message) to the serving cell, the UE may start a timer (e.g., a T350 parameter in the NR protocol, such as what is described in the 3GPP TS 38.331 v16.0.0).

In some implementations, a UE may move from an RRC Idle/Inactive state to an RRC Connected state before the UE assembles the complete target SIB successfully. Moreover, the UE may be allowed to request the target SIB through dedicated control signaling (e.g., even when the UE has stored the SIB segments of the target SIB). As such, the serving cell may transmit the complete target SIB to the UE through UE-specific dedicated control signaling, such as through an RRC(Connection)Reconfiguration message. Under such a condition, the UE may be allowed to send the target SIB request message to the serving cell. Moreover, the UE may discard the stored SIB segments of the target SIB after the UE receives the complete target SIB from the serving cell (e.g., when receiving the RRC(Connection) Reconfiguration message, which includes the requested SIB (s), successfully).

In some implementations, a UE may still maintain the stored SIB segments after the UE moves from an RRC Inactive/Idle state to an RRC Connected state. Moreover, when the UE is requesting the target SIB, the UE may not request the complete target SIB (e.g., SIB12). Instead, the UE may request only the SIB segments that the UE needs to assemble the complete target SIB. For example, if the serving cell broadcasts the following SIB segments: {SIB segment#0, SIB segment#1, SIB segment#2, SIB segment#3, SIB segment#4, SIB segment#5}, once the UE moves to an RRC Connected state with stored {SIB segment#0, SIB segment#2, SIB segment#3, SIB segment#5}, then while the UE is requesting for the target SIB from the serving cell, the UE may need to further indicate that the only SIB segment(s) the UE needs are segments 1 and 4 by transmitting one additional information element (IE): {Request SIB segment Number=1, 4} to the serving cell. After receiving such additional IE, the serving cell may simply deliver the requested SIB segments (e.g., {SIB segment#1, SIB segment#4}) to the UE (e.g., through the RRC(Connection)Reconfiguration message).

In some implementations, the serving cell may also indicate one additional IE to enable/disable SIB segment request (e.g., SIB segmentRequest={enabled or disabled}) which may be transmitted to the UE through dedicated control signaling or broadcasting system information. The UE nay then be able to request specific SIB segments from the serving cell. Therefore, if the SIB segmentRequest message is enabled, the UE may further indicate the SegmentNumber (s) of the SIB segment that the UE needs for target SIB assembly when the UE requests the target SIB from the serving cell (e.g., dedicatedSIBRequest message). In contrast, if the SIB segmentRequest message is disabled, the UE may not be able to further indicate the SegmentNumber(s) of the SIB segment that the UE needs.

It should be noted that the SIB segmentRequest may be transmitted by the UE to the serving cell through a 2-step random access procedure (e.g., the UE may transmit the SIB segmentRequest message in the PUSCH of MSGA) or through a 4-step random access procedure (e.g., the UE may transmit the SIB segmentRequest message in the MSG3 or MSG5). For a UE that is in an RRC Connected state, the UE may transmit the SIB segmentRequest message to the serving cell through UEAssistInformation, or UEsidelinkAssistanceInformation. In some additional embodiments, one bitmap may be transmitted in the SIB segmentRequest message, with each bit being associated with one SIB segment. The UE may then set a bit=1 to represent that the UE requests the corresponding SIB segment. Otherwise, the UE may set a bit=0 to represent that the UE does not request the corresponding SIB segment. In addition, the right-most bit may be associated with the SIB segment of SegmentNumber=0 and the left-most bit may be associated with the SIB segment of segmentType=the Last SIB segment.

In some implementations, one or more errors may happen during a SIB-assembly procedure. When an error happens, the UE may reply a 'SIB segment assembly error event' message to the serving cell. In some implementations, the UE may transmit the 'SIB segment assembly error event' message to the serving cell through a 2-step RA procedure (e.g., through MSGA delivery) or a 4-step RA procedure (e.g., through MSG3 or MSG5 delivery). In some other implementations, the UE (e.g., a UE in the RRC Connected state) may transmit the 'SIB segment assembly error event' message to the serving cell through UE-specific dedicated control signaling. In some additional implementations, the UE may drop/release all the stored SIB segments directly, for example, when the SIB segment assembly error event happens.

In some implementations, a prohibit timer (e.g., the T_sib-assembly-error parameter) may be provided to the UE to limit the UE to trigger the 'SIB segment assembly error event' only after the timer expires. As such, when a SIB segment assembly error event happens, the UE may trigger a timer (e.g., the prohibit timer) and then count the running timer from an initial value to zero. The UE may not be initiated to transmit the 'SIB segment assembly error event' message to the serving cell while the timer is still running or counting. Additionally, the UE may still try to receive and assemble the target SIB while the prohibit timer is still counting. Then, after the prohibit timer is expired (or after the prohibit timer counts to zero), the UE may initiate the SIB segment assembly error event report procedure and report the error to the serving cell. Moreover, the UE may discard all the stored SIB segments after the timer expires. Also, the initial value of the parameter T_sib-assembly-error may be transmitted to the UE through broadcasting system information or through UE-specific dedicated control signaling. Moreover, the UE may stop (or release) the counting T_sib-assembly-error after the UE obtains the complete target SIB. In addition, the UE may stop (or release) the counting T_sib-assembly-error after the UE discards all the stored SIB segments. The UE may reset the T_sib-assembly-error if the UE receives a new configuration (e.g., a new T_sib-assembly-error parameter) from the serving cell.

Table 1 below includes an example of a SIB and/or SIB segmentation validity check procedure performed by a UE.

TABLE 1

Upon receiving SIB12, the UE shall:
1> If the complete SIB12 has not been assembled within a period of 3 hours
    a.  the UE should discard any stored segments for SIB12
1> else if the complete SIB12 has been assembled within a period of 3 hours
    a.  the UE should confirm the assembled SIB12 as valid at this moment.
[. . .]
For SIB validity, the UE shall:
1> delete any stored version of a SIB after 3 hours from the moment it was successfully confirmed as valid.
1> for each stored version of a SIB or a SIB segment:
    a.  if the areaScope is associated and its value for the stored version of the SIB is the same as the value received in the si-SchedulingInfo for that SIB from the serving cell:
        i.  if the cell is non-NPN-only cell and the first PLMN-Identity included in the PLMN-IdentityInfoList, the systemInformationAreaID and the

TABLE 1-continued valueTag that are included in the si-SchedulingInfo for the SIB received
from the serving cell are identical to the PLMN-Identity, the
systemInformationAreaID and the valueTag associated with the stored
version of that SIB:
    1. consider the stored SIB or the stored SIB segment as valid for
       the cell.
  ii. if the cell is an NPN-only cell and the first NPN-Identity included in the
    NPN-IdentityInfoList, the systemInformationAreaID and the valueTag
    that are included in the si-SchedulingInfo for the SIB received from the
    serving cell are identical to the NPN-Identity, the
    systemInformationAreaID and the valueTag associated with the stored
    version of that SIB:
      1. consider the stored SIB or the stored SIB segment as valid for
         the cell.
  b. if the areaScope is not present for the stored version of the SIB and the areaScope
    value is not included in the si-SchedulingInfo for that SIB from the serving cell:
      i. if the cell is non-NPN-only cell and the first PLMN-Identity in the
        PLMN-IdentityInfoList, the cellIdentity and valueTag that are included
        in the si-SchedulingInfo for the SIB received from the serving cell are
        identical to the PLMN-Identity, the cellIdentity and the valueTag
        associated with the stored version of that SIB:
          1. consider the stored SIB or the stored SIB segment as valid for
            the cell.
      ii. if the cell is an NPN-only cell and the first NPN-Identity in the NPN-
        IdentityInfoList, the cellIdentity and valueTag that are included in the
        si-SchedulingInfo for the SIB received from the serving cell are
        identical to the NPN-Identity, the cellIdentity and the valueTag
        associated with the stored version of that SIB:
          1. consider the stored SIB or the stored SIB segment as valid for
            the cell

III. Requesting a Target Sib from a Serving Cell(s)

In some of the present implementations, System Information (SI) may include a MIB and a number of SIBs which are divided into minimum SI and other SI. Minimum SI may include basic information required for initial access and information for acquiring any other SI. In some implementations the minimum SI may include a MIB and a SIB1. A MIB may contain cell barred status information and other essential physical layer information of the cell which are required to receive further system information (e.g., in CORESET#0 configuration). The MIB may be periodically broadcast on a Broadcast Channel (BCH) (e.g., a Physical Broadcast Channel (PBCH)). A SIB1 may define the scheduling of other system information blocks and may contain information required for an initial access to the cell. The SIB1 may also be referred to as Remaining Minimum SI (RMSI) and may be periodically broadcast on the Downlink Shared Channel (DL-SCH) or may be sent in a dedicated manner on the DL-SCH to the UEs that are in an RRC_CONNECTED state.

Other SI may encompass all the SIBs that are not broadcast in the Minimum SI in some implementations. Such SIBs may be either periodically broadcast on a DL-SCH, broadcast on-demand on the DL-SCH (e.g., upon a request from the UEs that are in an RRC_IDLE, RRC_INACTIVE, or RRC_CONNECTED state), or may be sent in a dedicated manner, for example, on the DL-SCH to the UEs that are in an RRC_CONNECTED state (e.g., upon a request from the UEs that are in an RRC_CONNECTED state or when a UE has an active (DL) BWP with no common search space configured).

The other SI may include SIB2 to SIB14. SIB2 may contain cell re-selection information that are mainly related to the serving cell. SIB3 may contain information about the serving frequency and intra-frequency of the neighboring cells relevant to a cell re-selection (e.g., including the cell re-selection parameters common for a frequency, as well as the cell specific re-selection parameters). SIB4 may include information about the other NR frequencies and inter-frequency of the neighboring cells relevant to the cell re-selection (e.g., including the cell re-selection parameters common for a frequency, as well as the cell specific re-selection parameters). SIB5 may contain information about the E-UTRA frequencies and E-UTRA neighboring cells relevant to a cell re-selection (e.g., including the cell re-selection parameters common for a frequency, as well as the cell specific re-selection parameters). SIB6 may contain an Earthquake and Tsunami Warning System (ETWS) primary notification, while SIB7 may include an ETWS secondary notification. SIB8 may contain a Commercial Mobile Alert Service (CMAS) warning notification, while SIB9 may contain information related to the Global Positioning Service (GPS) time and Coordinated Universal Time (UTC).

For sidelink communications, the other SI may also include a SIB12 that may contain information related to NR sidelink communication, a SIB13 which may contain information related to SystemInformationBlockType21 for a V2X sidelink communication (e.g., as specified in TS 36.331 v16.0.0 clause 5.2.2.28), and a SIB14 may include information related to SystemInformationBlockType26 for the V2X sidelink communication (e.g., as specified in TS 36.331 v16.0.0 clause 5.2.2.33).

Additionally, a private network (e.g., a non-public network (NPN)) may support vertical and LAN services. The private network may be classified into a single non-public network (SNPN) and a public network integrated non-public network (PNI-NPN). Some embodiments may focus on the PNI-NPN solutions that are applicable to a wide range of use cases, such as a Small Office Home Office (SOHO) and residential use case, private network coverage deployments and so on. The 5G system may be enhanced to support NPN. Two network identities may be introduced for NPN: a Non-public network ID (NID) and a Closed Access Group (CAG) ID. The 5G RAN may also implement the NPN by enhancing some features, such as non-public network identification, discovery, selection/reselection, access control and mobility restrictions.

In some implementations, when the Non-Public Network is introduced, a UE may be classified as "a UE in SNPN access mode" or "a UE in non-SNPN access mode" (e.g., a UE that is not in the SNPN access mode). Additionally, a cell may be classified as an "SNPN cell", a "CAG cell", a "PLMN cell", a "cell supporting at least SNPN deployments", a "cell supporting at least PNI-NPN deployments", a "cell supporting at least PLMN deployments", a "cell supporting at least SNPN and PNI-NPN deployments", a "cell supporting at least SNPN and PLMN deployments", a "cell supporting at least PNI-NPN and PLMN deployments", a "cell supporting SNPN, PNI-NPN and PLMN deployments", etc.

An NPN-capable UE may (re)select a CAG cell based on an automatic CAG selection mode, a manual CAG selection mode, or a network-controlled manual CAG selection. The network-controlled manual CAG selection (e.g., a PLMN-controlled manual CAG selection) may be applied based on some requirements, such as the 5G system supporting a mechanism for a PLMN to control whether a user of a UE can manually select a non-public network hosted by the PLMN that the UE is not authorized to select automatically. Some implementations may provide a network controlled manual CAG selection mechanism that may include (i) one or more indicators for the RAN (e.g., a CAG cell) to broadcast to indicate that the PLMN may allow a user to manually select a CAG ID supported by the CAG cell, (ii) the UE's behavior upon receiving the one or more indicators (e.g., in SIB1, in SIB10, etc.), and (iii) a definition of a suitable cell.

In some implementations, a UE in an SNPN access mode may perform an SNPN selection. Then, a NAS entity of the UE may inform the AS entity of the UE of the selected SNPN and a registered SNPN. The UE in an RRC_IDLE/RRC_INACTIVE state may receive an indication in the SIB1 from a cell and then determine whether it is barred from the cell based on the indication. In some implementations, the UE may consider whether the cell is barred based on the indication associated with the selected SNPN. For example, if the iab-Support is not provided for the selected PLMN, nor the registered PLMN, nor the PLMN of an equivalent PLMN list, the UE may consider the cell as barred for the IAB-MT (e.g., in accordance with TS 38.304).

In some implementations, an RRC Connected UE (i.e., a UE that is in an RRC Connected state) may be enabled (e.g., by the serving RAN) to request system information (e.g., other SI, such as SIB12, SIB13, or SIB14) from its serving cell (e.g., through UE-specific dedicated control signaling) to implement a particular service (e.g., an LTE V2X (communication) service, an NR sidelink (communication) service, etc.).

Figure 4A:
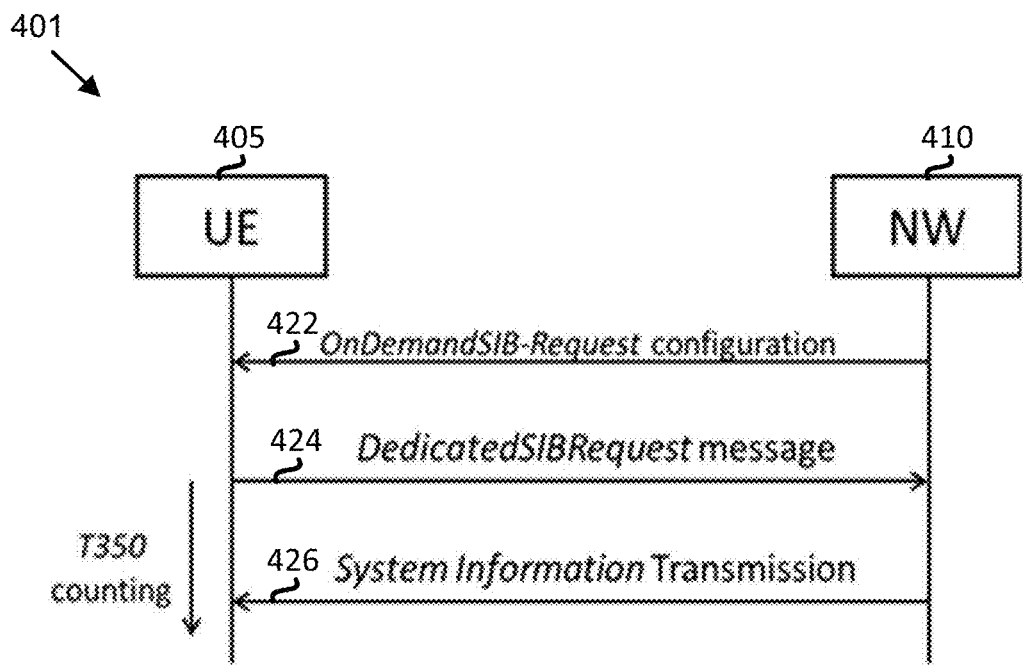
FIGS. 4A-4B are two diagrams illustrating communications between a UE and a network (NW) for requesting and receiving one or more system information blocks (SIBs), according to an example implementation of the present application.
Figure 4B:
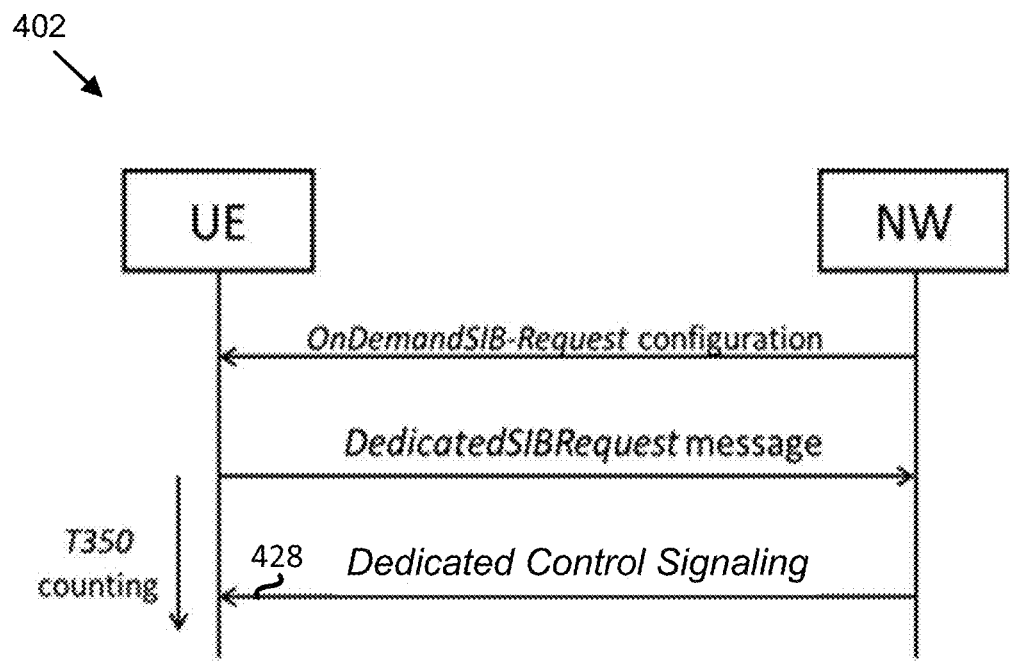

FIGS. 4A-4B are two diagrams illustrating communications between a UE and a network (NW) for requesting and receiving one or more system information blocks (SIBs), according to an example implementation of the present application. In some implementations, the cell may also configure the served UEs (e.g., via OnDemandSIB-Request configuration) with which SIB(s) the UEs would be enabled/allowed to request the serving cell (e.g., for a target SIB) via dedicated signaling (e.g., a DedicatedSIBRequest message). In some such implementations, the UE may not be allowed/enabled/configured to transmit a DedicatedSIBRequest message to its serving cell to request (at least) a target SIB when the target SIB is not enabled/allowed by the serving cell (e.g., to be requested via the DedicatedSIBRequest message). In some other implementations, which SIB(s) the UEs may be enabled/allowed to request may be pre-defined in the technical specification. In some additional implementations, the UE may be pre-installed (e.g., in USIM or memory module) with which SIB(s) the UE, may be enabled/allowed to send a request to the serving cell (e.g., via dedicated signaling).

FIG. 4A is a diagram 401 including a UE 405 and an NW 410 communicating with each other. As shown in the figure, UE 405 may first receive, in action 422, a configuration (e.g., an OnDemandSIB-Request configuration) from the serving network (e.g., NW 410). NW 410, in some implementations, may include one or more base stations that serve at least one UE, such as UE 405. UE 405 may have an RRC connection associated with one (or more) serving cells, which is a logical entity created by a base station based on a specific Radio Access Technology (RAT) (e.g., New Radio, UTRA, E-UTRA). Moreover, each cell may be realized based on different configurations in the physical layer (or Layer-1) (e.g., physical layer parameters, such as operating frequency carrier, bandwidth, (DL/UL/SL) Bandwidth Part (BWP), subcarrier spacing (SCS), numerology, cyclic prefix length), Medium Access Control (MAC) layer (or Layer-2) (e.g., MAC parameters), Radio Link Control (RLC) layer (e.g., RLC parameters), Packet Data Convergence Protocol (PDCP) layer (e.g., PDCP parameters), Service Data Adaptation Protocol (SDAP) layer (e.g., SDAP parameters), etc.

Additionally, NW 410 may include a radio access network (RAN) which may itself include one or more base stations of one or more radio access technologies (RATs). For example, in some implementations, one RAN may include one or more NR next Generation Node Bs (gNBs) and/or one or more E-UTRA Enhanced Node Bs (eNBs). In addition, a serving RAN (for a UE) may be a subset of the RAN and may include an NR gNB (e.g., while the UE is connecting with the network by maintaining an RRC connection with a (standalone) NR gNB) or an E-UTRA eNB. In some implementations, an MR-DC configuration (e.g., an E-UTRA-NR Dual Connectivity (EN-DC) configuration, a Next Generation E-UTRA and New Radio Dual Connectivity (NGEN-DC) configuration, or a New Radio Dual Connectivity (NR-DC) configuration) may be configured/provided to the UE to configure the serving RAN of the UE. As such, a UE may be configured with one master node (e.g., one NR gNB or one E-UTRA eNB) and (at least) one secondary node (e.g., one NR gNB or one E-UTRA eNB) to utilize the radio resources received from two or more base stations and/or for data exchange. In some implementations, in a dual connectivity scenario, the UE (e.g., UE 405) may receive the OnDemandSIB-Request configuration (e.g., in action 422) from a master node (e.g., through the signaling radio bearer 1 (SRB1) or signaling radio bearer 2 (SRB2) associated with the master node) or a secondary node (e.g., through the signaling radio bearer 3 (SRB3) associated with the secondary node). Each of the aforementioned master node or secondary node may be part of NW 410.

After receiving the configuration in action 422, UE 405 may send, in action 424, a dedicated SIB request message (e.g., a DedicatedSIBRequest message) to network 410 (e.g., to the master node and/or the secondary node) to request one or more SIBs. After transmitting the dedicated SIB request message, UE 405 may receive, in action 426, all (or a subset (or SIB segments) of) the requested SIB(s) from the master node and/or the secondary node, for example, through NW 410 broadcasting the request SIB(s) (e.g., through a Physical Broadcasting Channel (PBCH)/Physical Downlink Control Channel (PDCCH)/Physical Downlink Shared Channel (PDSCH), etc).

FIG. 4B is a diagram 402 including the same UE 405 and NW 410, as shown in FIG. 4A, communicating with each other. As shown in the figure, the UE may receive the configuration for SIB request and may send a dedicated SIB request message to the NW similar to what is described with reference to FIG. 4A. As shown in FIG. 4B, however, UE 405 may receive, in action 428, all (or a subset (or SIB segments) of) the requested SIB(s) from the master node and/or the secondary node through dedicated (or UE-specific) control signaling (e.g., RRC signaling specific to the UE).

Different UEs may be associated with different topologies of the serving RAN in some implementations. In addition, the serving RAN may be connected to a 5G core network (5GC) and/or to an Evolved Packet Core Networks (EPC) as a core network connection that supports one or more UEs.

In some of the present implementations, a UE may send an on demand dedicated SIB request (e.g., using an OnDemandSIB-Request configuration) to one or more serving cells as shown below in Table 2.

TABLE 2

| | |
|---|---|
| OnDemandSIB-Request Configuration::= | SEQUENCE { |
| onDemandSIB-Request | ENUMERATED {true}, |
| onDemandSIB-RequestProhibitTimer | ENUMERATED {s0, s0dot5, s1, s2, s5, s10, s20, s30, spare4, spare3, spare2, spare1} |
| onDemandSIB-Enabled | Sequence {SIB12, SIB13, SIB14, SIB#i}, |

In Table 2 above, information element 'onDemandSIB-Request={true}' is used to enable the UE to request the system information through UE dedicated control signaling (e.g., the DedicatedSIBRequest message as shown in FIG. 1). Otherwise, the UE may be disabled to transmit the DedicatedSIBRequest message if the UE does not receive the OnDemandSIB-Request Configuration (e.g., with 'onDemandSIB-Request={true}') or the OnDemandSIB-Request Configuration is set to release from the serving cell or the 'onDemandSIB-Request' is set to {false}'. In some implementations, the NW may further indicate which SIB(s) the UE is enabled to request from the serving NW by transmitting the IE 'OnDemandSIB-Enabled' (e.g., a list of SIBs which the UE is allowed/enabled to request by sending a request message to the serving cell) in the OnDemandSIB-Request. In addition, the UE may not be allowed to request a SIB by sending the DedicatedSIBRequest message to the serving cell if the SIB is not included in the received 'OnDemandSIB-Enabled'. The UE may decide on which SIB to request based on the UE's preferences (e.g., based on the specific services in which the UE may have interest, such as a Vehicle-to-Everything (V2X) service, an NR sidelink service, a Multicast Broadcast Service, etc.) or through a request from the upper layers (e.g., the Non-Access Stratum layer (or entity) or the application layer).

In some implementations, if the UE receives the information element 'onDemandSIB-Request={true}', the UE may store the information element and then, the UE may be enabled to perform the request for system information through the UE-specific dedicated control signaling (e.g., the DedicatedSIBRequest message) in uplink direction. A UE specific dedicated control signaling may be scrambled by a UE-specific Radio Network Temporary Identifier (RNTI), such as C-RNTI, which may be preconfigured by the serving RAN, for example, to perform a Cyclic Redundancy Check (CRC) procedure. Additionally, a UE-specific signaling/data packet may also be encrypted by UE-specific Access Stratum security keys, which may only be known by the UE and the serving RAN.

In some implementations, once the UE transmits the dedicated control signaling for requesting system information, the UE may remove/release the information element 'onDemandSIB-Request={true}', or may keep the stored information element 'onDemandSIB-Request={true}'. For example, in the 3GPP technical specification, the onDemandSIB-Request (configuration) may be further configured as 'Need N' (No action (one-shot configuration that is not maintained)), which means that the IE 'onDemandSIB-Request={true}' is used for (configuration) fields that are not stored and the presence of which may only cause a one-time action (e.g., the UE may be triggered to send the DedicatedSIBRequest message to the serving cell) by the UE. The UE may then release the IE 'onDemandSIB-Request' upon transmitting the DedicatedSIBRequest message to the serving cell. In some implementations, the OnDemandSIB-Request Configuration may be configured as 'Need N' in the 3GPP technical specification. As such, the UE may release the 'OnDemandSIB-Request Configuration' upon transmitting the DedicatedSIBRequest message to the serving cell. In some implementations, the (one-shot) 'onDemandSIB-Request' or 'OnDemandSIB-Request Configuration' may be released/removed while a counter (e.g., the counting T350, as shown in FIGS. 4A-4B) expires (e.g., the (one-shot) 'onDemandSIB-Request' or 'OnDemandSIB-Request Configuration' may still be kept while the T350 is still counting). Under such a circumstance, the UE may still be able to transmit another DedicatedSIBRequest message (e.g., based on the stored configuration) before the counter (e.g., the counting T350) expires.

Once the UE receives the requested system information, the UE may remove/release the information element 'onDemandSIB-Request={true}' in some implementations or may keep the stored information element 'onDemandSIB-Request={true}' in some other implementations. In yet some implementations, the UE may remove/release the IE 'onDemandSIB-Request={true}' only when the UE receives all of the requested SIB(s) successfully.

In some implementations, as will be discussed in more detail, a UE may remove/release the IE 'onDemandSIB-Request={true}' while the UE is receiving a subset (e.g., one or more segments) of the requested (or target) SIB(s) from the serving RAN successfully. As will be discussed in more detail, the UE may release the IE 'onDemandSIB-Request={true}' and send a new SIB request, for example, when the UE switches from one active (DL) BWP to another (DL) BWP (e.g., which does not include a search space for receiving SIBs).

In some additional implementations, the UE may remove/release the IE 'onDemandSIB-Request' if there is any pending SIB-request message (e.g., DedicatedSIBRequest message) in the buffer of the UE. In some additional implementations, the UE may not remove/release the IE 'onDemandSIB-Request' if there is any pending SIB-request message (e.g., DedicatedSIBRequest message) in the buffer of the UE. In some implementations, the serving RAN may instruct the UE to remove/release the IE 'onDemand-SIB-Request' through an explicit instruction (e.g., a UE-specific RRC signaling in downlink direction). In some other implementations, the serving RAN may reconfigure the onDemandSIB-Request={'true'} to the UE by transmitting another UE-specific control signaling (e.g., a UE-specific RRC signaling). In addition, the pending SIB-request message (if there is any) may also be removed accordingly while the DedicatedSIBRequest message is removed/released or set to 'false'. In some implementations, the UE may not remove/release the IE 'onDemandSIB-Request' if there is any pending SIB-request message in the buffer of the UE.

In some implementations, the serving RAN may instruct the UE to remove/release the 'OnDemandSIB-Request Configuration' by sending UE-specific control signaling (e.g., RRC signaling) to the UE. Thereafter, after receiving the instruction, the UE may remove/release the stored 'OnDemandSIB-Request Configuration'. In addition, the pending SIB-request message (if there is any) may also be removed accordingly. In some additional implementations, the UE may not remove/release the IE 'onDemandSIB-Request Configuration' when there is any pending SIB-request message in the buffer of the UE. For example, the UE may remove/release the IE 'onDemandSIB-Request Configuration' when the pending SIB-request message in the buffer of the UE side is delivered to the serving RAN successfully. Once the UE receives another information element 'onDemandSIB-Request={false}' (or 'onDemandSIB-Request={null}', the UE may release/remove the information element 'onDemandSIB-Request={true}'.

In some implementations, after receiving the 'OnDemandSIB-Enabled' list from the serving cell, the UE may only be allowed to request the system information blocks indicated by the 'OnDemandSIB-Enabled' list from the NW by sending the DedicatedSIBRequest message to the serving cell. In some implementations, the OnDemandSIB-Enabled list may be preconfigured in the technical specification, rather than being configured in the OnDemandSIB-Request Configuration. In some other implementations, the OnDemandSIB-Enabled list may be broadcast in system information (e.g., in SIB1 or other system information blocks) or via UE-specific DL control signaling (e.g., RRC signaling, such as an RRCReconfiguration message).

In some implementations, after receiving the OnDemandSIB-Request Configuration (e.g., after operation 422, as shown in FIGS. 4A-4B), a UE may be triggered to send a DedicatedSIBRequest message to request one or more SIBs from the NW (e.g., from a serving cell). For example, a UE may be triggered to request a SIB if the UE is in an RRC Connected state with an active (DL) BWP that is not configured with any search space (e.g., any common search space), for example, having a field searchSpaceOtherSystemInformation (e.g., in the BWP configuration associated with the active BWP), and the UE has not stored a valid version of one or more required/target SIB(s) (e.g., or has not stored a valid SIB according to a request from the upper layers).

For example, a UE may be in the middle of receiving the SIB segments of a target SIB through one or more search spaces of an active (DL) BWP associated with the UE's serving cell. During the reception of the SIB segments and before successfully assembling the target SIB based on the received SIB segments, however, the UE may switch (or move) from one active (DL) BWP to another active (DL) BWP. Under such a circumstance, if the second BWP does not have a common search space (or all of the common search space (for system information reception) is de-activated by the serving cell via broadcasting SIB or UE-specific DL control signaling, such as RRC signaling/MAC CE/DCI), the UE may release the received (and stored) SIB segments and initiate another dedicated SIB request, and may receive the new SIB segments, for example, when the UE switches (or moves) to yet another active (DL) BWP that includes the required search space(s) for receiving SIB segments. In some other implementations, after switching to the second BWP, the UE may still keep the stored SIB segments until the UE receives the target SIB (e.g., SIB12) via UE specific RRC signaling (e.g., as shown in action 428 of FIG. 4B) or via broadcasting system information again (e.g., as shown in action 426 of FIG. 4A).

As described above, a base station (e.g., a gNB) may configure (e.g., through RRC signaling) one or more search spaces (associated with one or more DL-BWP(s)) to a UE. The UE may monitor the configured search spaces in (all) the active DL-BWP(s) in order to receive (and decode) the Physical Downlink Control Channel (PDCCH) candidates included in the search space(s). By monitoring the PDCCH candidates, the UE may obtain control information, such as Downlink Control Information (DCI), from the PDCCH candidates, as well as the SIBs. In the current New Radio (NR) specification, a component carrier may include as many as four Bandwidth Parts (BWPs) and for each BWP, as many as ten search spaces (having different search space identifications (IDs)) may be configured to a UE.

The base station, in some embodiments, may configure the UE with the search space information through RRC signaling. In some other embodiments, the UE may obtain the search space configuration implicitly. That is, the UE may decode the Synchronization Signal Blocks (SSBs), and the Physical Broadcast Channel (PBCH) in the SSBs, in order to obtain the search space configuration. The search space configuration, which the UE obtains from the PBCH decoding, is regarded as one search space configuration having the search space ID to be set to 0 by default. Each search space may contain different configuration for the UE to decode the PDCCH candidates. For example, the search space configuration may include, but is not limited to, a searchSpaceType, such as the Slot Format Indicator (SFI)-PDCCH reception, the downlink preemption indication reception, the UE-specific DCI reception, the system information, etc.; a ControlResourceSetID, where each ControlResourceSetID corresponds to one Control Resource Set (CORESET) configuration (which may also be provided through control signaling, such as dedicated control signaling or broadcast message); and a Control Resource Set which may further include a frequency domain resource location, a start symbol in time domain, the duration of Control Resource Set (Contiguous time duration of the CORESET in number of symbols), pdcch-DMRS-ScramblingID, etc. Other parameters, such as {monitoringSlotPeriodicityAndOffset, monitoringSymbolsWithinSlot, nrofCandidates#1} may also be included in the search space configuration.

Figure 5:
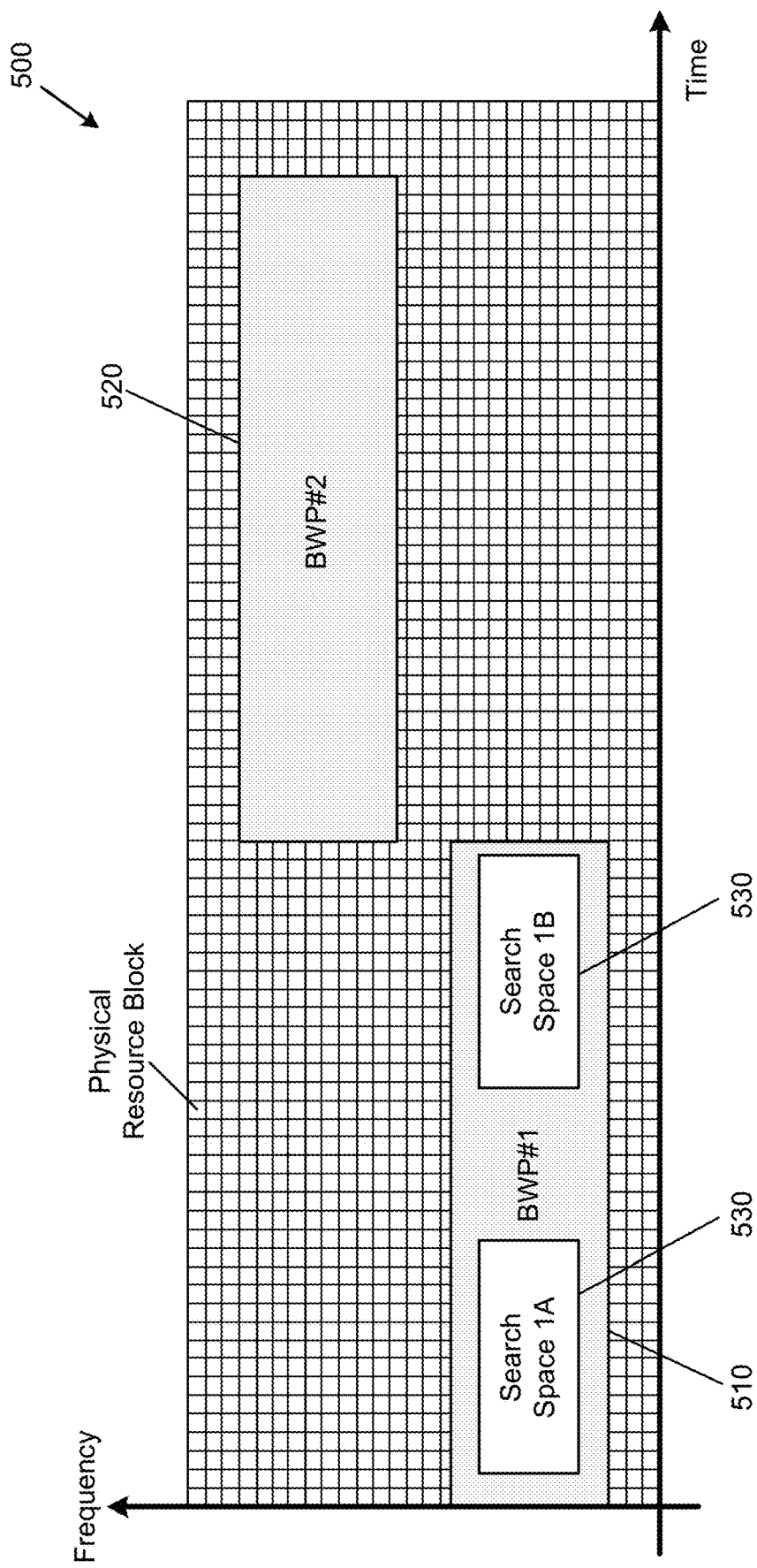
FIG. 5 is a time-frequency grid illustrating a serving cell (e.g., a component carrier) configured with multiple bandwidth parts (BWPs), according to an example implementation of the present application.

FIG. 5 is a time-frequency grid illustrating a serving cell (e.g., a component carrier) configured with multiple bandwidth parts (BWPs), according to an example implementation of the present application. Specifically, FIG. 5 illustrates a component carrier 500 that includes two (DL) BWPs 510 and 520 (e.g., BWP#1 and BWP#2, respectively). BWP 510 may include search space 530, while BWP 520 may include no (or may not be configured with any) search space (e.g., a common search space). Although the component carrier 500 in the illustrated example includes only two BWPs and only one of the BWPs includes only one search space, as described above, each cell, in the current specification of the NR, may be configured with up to four BWP(s) and each BWP may be configured with up to ten search space sets (e.g., component carrier 500 may be configured with BWP1-BWP4, BWP 110 may be configured with search spaces 1A-1J, and BWP 120 may be configured with search spaces 2A-2J (not shown in the figure)).

Each BWP may have a different numerology, such as subcarrier spacing, and even different frequencies. In the illustrated example, the UE may monitor the search space 530 in the active BWP 510 to receive the SIB segments of a requested (or target) SIB, and when BWP 520 becomes active, the UE may switch to monitoring the search space (if any) in the active BWP 520 for receiving the SIB segments. However, as illustrated in FIG. 5, BWP 520 does not have a search space configured to it yet. As such, in some implementations, the UE may release all the previously received and stored SIB segments associated with BWP 510 and may transmit a new request for the target SIB to the network (e.g., through the serving cell). The UE may then receive the requested target SIB, for example, when the UE switches to another active BWP that is configured with a search space.

Under certain circumstances, even though a UE may be configured with up to four BWPs, the UE may only have one active BWP (in time domain) for each cell. However, the UE may switch between the configured BWPs and keep the PDCCH receptions based on all of the configured search spaces, which may be preconfigured in RRC signaling in the active BWP. To support carrier aggregation (CA) and dual-connectivity (DC), in NR, each UE may support up to 16 downlink carriers without DC and 32 downlink carriers with DC. In addition, for the future releases, it has been envisaged that a component carrier may have more than one active BWP and with the potential introduction of multiple connectivity in the future releases, each UE may be configured with more than one component carrier.

In some implementations, to prevent frequent DedicatedSIBRequest messages from being delivered by the UE, one additional timer (e.g., T350) may be configured to the UE. In some implementations, the UE may initiate a T350 timer (e.g., by setting the value of T350=onDemandSIB-Request-ProhibitTimer, which may also be configured by the serving cell in the OnDemandSIB-Request Configuration, as shown in Table 2 above), after the UE transmits a DedicatedSI-BRequest message with an onDemandSIB-RequestList to the serving cell. The UE may further indicate the requested SIB(s) in the onDemandSIB-RequestList, which may be included in the DedicatedSIBRequest message. In the onDemandSIB-RequestList, the UE may request one or more SIBs from the serving cell.

In some implementations, the onDemandSIB-RequestList may be a sequence, such as onDemandSIB-RequestList={'SIB11', 'SIB12', 'SIB13', 'SIB14'}. In some other implementations, the onDemandSIB-RequestList may be a bitmap, for example, where each bit in the bitmap is associated with a specific SIB (e.g., each bit having a one-to-one relationship with a SIB) in the 'OnDemandSIB-Enabled' list (e.g., such that the length of the bitmap may be equivalent to the number of SIBs in the 'OnDemandSIB-Enabled' list). Moreover, the sequence or the bitmap (e.g., from the leftmost bit to the rightmost bit) may be associated with the SIBs in the 'OnDemandSIB-Enabled' list in an ascending (or descending) order.

In some such implementations, in the transmitted onDemandSIB-RequestList, the UE may indicate a bit to be '1' (or 'true') when the UE requests the associated SIB. In contrast, the UE may indicate a bit to be '0' (or false) if the UE does not request the associated SIB in the DedicatedSIBRequest message. After the UE transmits the DedicatedSIBRequest message, the UE may receive (all or a subset of) the requested SIB(s), for example, through UE-specific dedicated control signaling (e.g., an RRCReconfiguration message to the UE) or through the broadcasting system information. The UE may not be allowed to send DedicatedSIBRequest message while the T350 timer is still counting/running (which may also mean that the T350 timer is still active).

In some implementations, the counting T350 may be stopped by the UE in the following conditions, as shown in Table 3 below.

TABLE 3

| Timer | Start | Stop | At expiry |
|---|---|---|---|
| T350 | Upon transmitting DedicatedSIBRequest message with onDemandSIB-RequestList. | 1) Upon acquiring the requested SIB(s) or positioning SIB(s), <br> 2) Upon the reception of the RRCRelease by the UE, <br> 3) upon initiating the RRC connection re-establishment procedures, <br> 4) Upon receiving onDemandSIB-Request set to release, <br> 5) Upon the reconfigurationWithSync was included in spCellConfig of an MCG, and when MAC of an NR cell group successfully completes a Random Access procedure triggered above (e.g., TS 38.331 v16.0.0 Section 5.3.5.3 Reception of an RRCReconfiguration by the UE) | No action |

With reference to Table 3 above, there are still some additional conditions which may impact the Start/Stop conditions of the timer T350. Moreover, since the timer T350 may influence the UE behavior with regard to some specific services (e.g., LTE V2X (sidelink communication) service, NR sidelink (communication) service, Multicast Broadcast Service (MBS), etc.), additional embodiments discussing the timer T350 are discussed in more detail below.

In some implementations, the UE may reset/restart the timer T350 if the UE requires one or more new SIBs (e.g., for a specific service) from the serving cell. For example, a UE in an RRC Connected state may be configured to implement an LTE V2X service or an NR sidelink service, for which the UE has not sent any request to the serving cell before. At the same time, there may still be an active timer T350 that is counting/running when the new service request is initiated (e.g., by the upper layers of the UE, such as the V2X layer or NAS layer).

In such a scenario, the UE may stop the active timer T350 and then send a new SIB request message (e.g., a DedicatedSIBRequest message), which may include a new onDemandSIB-RequestList to indicate the requested SIB(s) (e.g., a V2X-SIB, such as SIB12 and/or SIB13 and/or SIB14), to the serving cell. After sending the new DedicatedSIBRequest message, the UE may re-start the T350 (e.g., by resetting T350=onDemandSIB-RequestProhibitTimer).

In some implementations, the timer T350 may be stopped only when the UE is triggered to request one or more predefined SIBs (e.g., predefined in the technical specification or predefined in the OnDemandSIB-Request Configuration). In contrast, the timer T350 may not be stopped (and the UE may not be allowed to transmit a new DedicatedSIBRequest message) when the SIB which the UE requests does not belong to the predefined SIBs configured to the UE.

In some implementations, a UE may be allowed to transmit another DedicatedSIBRequest message with different content (e.g., a different onDemandSIB-RequestList) when the timer T350 is counting/running. In some other implementations, a UE may be allowed to transmit another DedicatedSIBRequest message with different content (e.g., a different onDemandSIB-RequestList) when T350 is counting/running only when the UE is triggered to request one or more pre-defined SIBs.

In some implementations, there may be another SI request message (e.g., a V2X-SIB request message) for a UE to request, for example, for the V2X related SIB(s). In some implementations, when T350 is counting/running, a UE may not be allowed to transmit a V2X-SIB request message. In some implementations, a UE may be allowed to transmit a V2X-SIB request message irrespective of whether T350 is counting or not. In some implementations, a timer, such as a V2X-T350, may be configured to count/run if a system information request message for the V2X-SIB (e.g., the SIB12/SIB13/SIB14) is delivered by the UE to the serving RAN, for example, when the UE transmits a V2X-SIB request message. The UE may only be allowed to transmit another V2X-SIB request message when the V2X-T350 is not running or is stopped in some implementations.

Furthermore, in some implementations, the V2X-SIB Request message may be delivered independently with the transmission of a SIB request (e.g., transmission of the DedicatedSIBRequest), which may be transmitted by the UE to request other System information than V2X-SIB. In some implementations, the UE may configure V2X-T350=onDemandSIB-RequestProhibitTimer when the UE transmits the V2X-SIB Request message (e.g., to the lower layers, such as the physical (PHY) layer) for transmission. In some other implementations, another information element (IE) (e.g., an onDemandSIB-RequestProhibitTimer_V2X IE) may also be configured in the OnDemandSIB-Request Configuration to the UE. As such, when a V2X-SIB Request message is transmitted by the UE (e.g., to the lower layers for transmission in the air link), the UE may configure the timer V2X-T350=onDemandSIB-RequestProhibitTimer V2X and then start counting to zero. Thereafter, the UE may not be allowed to transmit a V2X-SIB Request message again while the V2X-T350 is still counting.

Other UE behaviors corresponding to the start/stop/expiry conditions of the timer V2X-T350 may follow the UE behavior as shown in the Table 3 above. In some other implementations, a pending V2X-SIB Request message (or a pending V2X-SIB Request procedure) may be released when the UE is triggered to release (or stop/remove) the on-going NR sidelink service (or LTE/NR V2X service). In other words, the pending V2X-SIB Request procedure may not be continued if the UE is not interested to implement an NR sidelink service or an LTE/NR V2X service. Additionally, in some implementations, the counting V2X-T350 may also be released under such circumstances.

In some implementations, for a conventional DedicatedSIBRequest message with counting T350, the UE may also stop the ongoing DedicatedSIBRequest message delivery (or may stop counting (down) of the timer T350) if the UE does not need the requested SIB anymore (e.g., the UE is triggered by the upper layers to stop a service (e.g., MBS) that needs the requested SIB while an active SIB on-demand procedure is proceeding).

A. Exceptional Case for Delivering a V2X-SIB

In some implementations, a UE may indicate a V2X-SIB request to the serving cell through control signaling related to a sidelink communication. For example, in some implementations, the UE may send a "SidelinkUEInformationNR" message to the serving cell. Moreover, the UE may also indicate an "NR Sidelink System Information Request={true}" or "NR Sidelink System Information Request=1" for the corresponding V2X-SIB request (e.g., SIB12 and/or SIB13 and/or SIB14) to the serving cell. After receiving the SidelinkUEInformationNR, in some such implementations, the serving cell may transmit the SIB12 to the UE through UE-specific dedicated control signaling (e.g., RRCReconfiguration message). In some implementations, the SIB12 may be included as an information element of sl-ConfigDedicatedNR, which may be included in the RRCReconfiguration message. In some additional implementations, the NR Sidelink System Information Request may be configured as a sequence, such as the NR Sidelink System Information Request={'SIB12', 'SIB13', 'SIB14'}. Additionally, the UE may further indicate which V2X-SIB the UE needs by transmitting the NR Sidelink System Information Request IE, for example, in the SidelinkUEInformationNR message.

In some additional implementaitons, the UE may also be able to request SIB13/14 by sending a SidelinkUEInformationNR message to the serving cell (e.g., sending an E-UTRA Sidelink System Information Request={true} in the SidelinkUEInformationNR message). In other implementations, the UE may also be able to request SIB12 by sending a SidelinkUEInformationEUTRA message to the serving cell (e.g., sending an NR Sidelink System Information Request={true} in the SidelinkUEInformationEUTRA message).

In addition, the timer T350 (or any other V2X-T350 timer) may not be triggered/stopped/released when the UE sends the SidelinkUEInformationNR message for V2X-SIB request. In some implementations, the UE may still be able to transmit SidelinkUEInformationNR message for V2X-SIB enquiry regardless of whether there is any active T350 (or V2X-T350) counting at the UE side. In some other implementations, the V2X-T350 may still be triggered when a SidelinkUEInformationNR message for V2X-SIB request is delivered by the UE (e.g., to the lower layers for packet delivery). In addition, the UE may not be allowed to deliver the SidelinkUEInformationNR message for V2X-SIB enquiry while the V2X-T350 is counting.

In some implementations, the UE may send a "SidelinkUEInformationEUTRA" message to the serving cell. Moreover, the UE may also indicate "E-UTRA Sidelink System Information Request={true}" or "E-UTRA Sidelink System Information Request=1" (or "LTE V2X System Information Request=1" or "LTE-V2X System Information Request=1") corresponding to the requested V2X-SIB (e.g., SIB21 and/or SIB26). After receiving the SidelinkUEInformationEUTRA, the serving cell may transmit SIB21/26 to the UE through UE-specific dedicated control signaling (e.g., RRCReconfiguration message). In some implementations, the requested E-UTRA sidelink system information (e.g., SIB18/19/21/26) may be included as an information element of sl-ConfigDedicatedNR, which may be included in the RRCReconfiguration message. In some additional implementations, the E-UTRA Sidelink System Information Request may be configured as a sequence, such as an E-UTRA Sidelink System Information Request={'SIB18', 'SIB19', 'SIB21', 'SIB26'}. The UE may further indicate which (E-UTRA) V2X-SIB the UE needs by transmitting the E-UTRA Sidelink System Information Request IE in the SidelinkUEInformationEUTRA message.

In addition, the T350 timer may not be triggered/stopped/released when the UE sends the SidelinkUEInformationEUTRA message for (E-UTRA) V2X-SIB requests. In some implementations, the UE may still be able to transmit the SidelinkUEInformationEUTRA message for the (E-UTRA) V2X-SIB enquiry irrespective of whether there is any active T350 counting (down) at the UE side.

In some additional implementations, the request for V2X-SIB (e.g., as described above) may not be limited by the counting T350 timer. In other words, the UE may still be able to send the SidelinkUEInformationNR/SidelinkUEInformationEUTRA (e.g., corresponding to a V2X-SIB request) even when the T350 is still counting. In addition, the T350 timer may not be stopped/reset by sending the SidelinkUEInformationNR or receiving the V2X-SIB through the UE-specific downlink control signaling in some implementations.

It should be noted that the above-described mechanism may also be applicable to the SIB(s) that are configured to support other services (e.g., Multicast Broadcast Service, etc.).

In some implementations, if the UE sends the SidelinkUEInformationNR or receives the V2X-SIB, the UE may stop/reset the T350 timer (if it is running). In some additional implementations, the T350 may be stopped/reset only when the requested V2X-SIB is included in the DedicatedSIBRequest message (which triggers the UE to start T350 counting) transmitted by the UE. In addition, when the T350 timer is stopped, the UE may resend another DedicatedSIBRequest message, which may not be included in the requested V2X-SIB to the serving cell (e.g., since the UE may have already requested the proposed V2X-SIB through the proposed SidelinkUEInformationNR/SidelinkUEInformationEUTRA message).

In some additional implementations, the existing on-demand SIB procedure (e.g., as shown in Table 3 above) may be applicable together with or independent of the above-described mechanisms. As such, the UE may still be able to send the SidelinkUEInformationNR or SidelinkUEInformationEUTRA while the T350 timer is still counting (or running). In addition, the UE may or may not start (restart/stop) the counting of the T350 timer after the aforementioned SidelinkUEInformationNR/SidelinkUEInformationEUTRA is transmitted.

B. Impact of the V2X-SIB Segmentation

In some implementations, a V2X-SIB (e.g., SIB12 in the NR sidelink protocols) may need to be segmented into several SIB-segments for transmission, as described in great detail above. Thereafter, the UE may need to assemble all the received (and stored) SIB-segments to obtain a valid target SIB (e.g., SIB12).

In some aspects of the present implementations, the UE may receive the SIB segments from different cells (e.g., the serving cell and the target cell during a conditional handover procedure or a DAPS handover procedure). In some such implementations, the T350 timer may keep counting before the UE is able to assemble the whole target SIB (e.g., a V2X-SIB, such as SIB12) based on the received SIB segments. In some implementations, the counting of the T350 timer may be stopped while the UE is assembling the received SIB segments (e.g., which the UE receives from one or more cells in the NW) to obtain a valid target SIB. In some additional implementations, the counting T350 may be stopped if the UE receives any SIB segment from the serving cell (e.g., when the UE requests only V2X-SIB from the serving cell).

In some additional implementations, the UE may still be able to transmit the DedicatedSIBRequest message to the serving cell even when the UE has already received/stored one or more SIB segments (e.g., corresponding to the target SIB) from the serving cell (or from the previous serving cell), but the UE may still not be able to assemble the target SIB based on all of the received SIB segments from the serving RAN.

Figure 6:
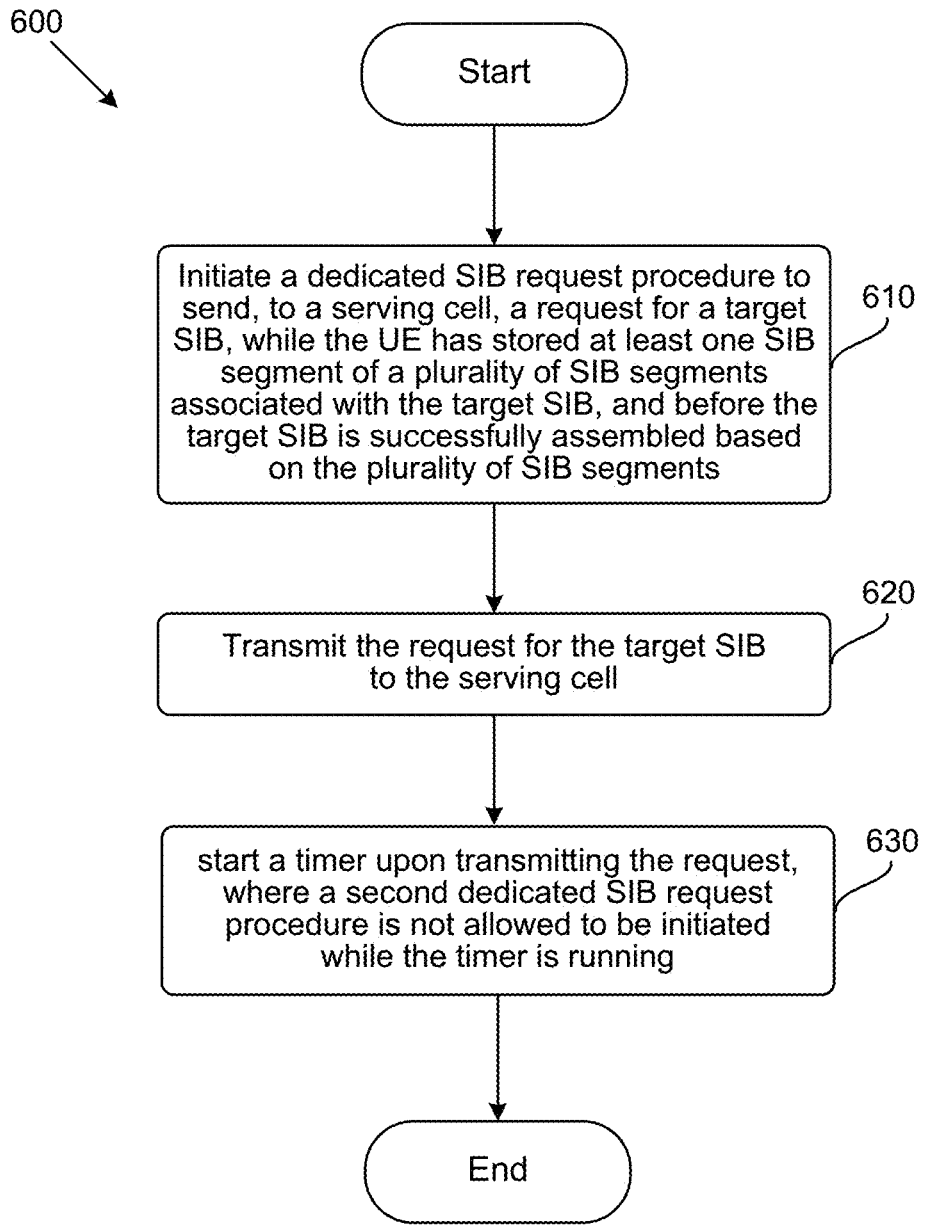
FIG. 6 is a flowchart illustrating a method (or process) performed by a UE for requesting a target SIB associated with a target service, according to an example implementation of the present application.

FIG. 6 is a flowchart illustrating a method (or process) 600 performed by a UE for requesting a target SIB associated with a target service, according to an example implementation of the present application. Process 600 may start, at 610, by initiating a dedicated SIB request procedure to send, to a serving cell, a request for the target SIB. As described above, in some implementations, the dedicated SIB request procedure may be initiated while the UE is receiving a plurality of SIB segments associated with the target SIB (e.g., based on the initiated dedicated SIB request procedure) from the serving cell, and before the target SIB is assembled successfully based on the received plurality of SIB segments. That is, in some implementations, the dedicated SIB request procedure may be initiated while the UE has stored at least one SIB segment of a plurality of SIB segments associated with the target SIB, and before the target SIB is successfully assembled by the UE based on the plurality of SIB segments.

In some implementations, initiating the dedicated SIB request procedure may include initiating the dedicated SIB request procedure when the UE is not configured with any common search space for receiving system information on any of the currently active downlink bandwidth parts (BWPs) associated with the UE. For example, the UE may have one or more BWPs that are currently active, but none of those active BWPs may not include a common search space. As another example, the UE may switch from a current active downlink BWP to a second active downlink BWP. In some implementations, the second active downlink BWP may not be configured with any search space (e.g., common search space) for receiving system information. In some implementations, the UE may thereafter switch to another active downlink BWP that is configured with at least one search space for system information reception and may assemble the requested (or target) SIB after receiving the remaining SIB segments in the plurality of SIB segments through the other BWP.

After initiating the dedicated SIB request procedure, process 600 may transmit, at 620, to the serving cell, the request for the target SIB. In some implementations, the process may transmit the request through dedicated UL control signaling. Process 600 may then start, at 630, a timer (e.g., the T350 timer as described above) upon transmitting the request for the target SIB. As described above, while the T350 timer is running (e.g., counting down to reach zero) a second dedicated SIB request procedure may not be allowed to be initiated by the UE. Process 600 may then end.

In some implementations, after transmitting the request (and starting the timer), process 600 may receive the remaining SIB segments in the plurality of SIB segments (e.g., that are not stored at the UE yet) and then assemble the target SIB based on the received and stored plurality of SIB segments (e.g., while the timer is counting/running). The process may then stop the timer after successfully assembling the target SIB. In some implementations, the process may receive the remaining SIB segments from the serving cell via UE-specific downlink control signaling, as described above.

In some implementations, after transmitting the request (and starting the timer), process 600 may receive, from the serving cell, the target SIB (e.g., as a whole), for example, via UE-specific downlink control signaling. That is, in some implementations, the target SIB may not be segmented by the serving cell (e.g., into a plurality of SIB segments) and the UE may receive the non-segmented target SIB through a UE-specific DL control signaling. The process may then stop the timer after receiving the target SIB and drop any SIB segment of the plurality of SIB segments that the UE may have stored (e.g., stored before receiving the target SIB).

After successfully assembling the target SIB based on the received plurality of SIB segments, process 600 may set the timer to zero (or may stop the timer) such that a second dedicated SIB request procedure may be allowed to be initiated (e.g., for receiving another target SIB). In some implementations, the target SIB may include an NR sidelink radio configuration, such access stratum (AS) configuration, for the UE to implement a corresponding target service (e.g., that is associated with the target SIB), such as a sidelink communication service. In some such implementations, the UE may select a second serving cell to move from its current serving cell (e.g., in a (conditional/DAPS) handover procedure) and, after moving to the second serving cell, may implement the NR sidelink communication service based on the NR sidelink radio configuration included in the target SIB received in the serving cell (e.g., after determining that the target SIB is still valid on the second serving cell).

In some implementations, the UE may initiate the dedicated SIB request procedure and start the timer while the UE is in an NR RRC Connected state. In some such implementations, after sending the request for SIB, the UE may switch its RRC state from the RRC Connected state to one of an RRC Inactive state or an RRC Idle state. Thereafter, the UE may implement the corresponding service (e.g., the NR sidelink communication service) based on the configuration (e.g., the NR sidelink radio configuration) included in the target SIB after switching the RRC state.

C. DAPS Handover Scenario

In some implementations, a radio bearer (e.g., Data Radio Bearer/Signaling Radio Bearer) may be configured as a DAPS bearer. In some implementations, the AS layer (or entity) of the UE may configure a DAPS bearer to be associated with a target cell (or a target cell group), which may be different from DAPS bearer that is associated with the source cell (or the source cell group) of the UE. In some such implementations, the serving cell (e.g., the source cell) may indicate to the UE the target cell (or the target cell group) and the associated DAPS radio bearer configuration through UE-specific dedicated control signaling (e.g., RRC signaling, such as in an RRCReconfiguration message).

In some implementations, new signaling radio bearer(s) (SRBs), such as SRB0, SRB1, SRB2, may be configured to be associated with the target cell when at least one DAPS bearer is configured. In addition, the original SRBs associated with the source serving cell(s) may still be maintained in some implementations.

In some implementations, during a DAPS handover procedure, a timer, such as the T350 timer may remain as active (e.g., counting/running). For example, a T350 timer associated with a source cell may be active/running during the DAPS Handover (DAPS HO) procedure (e.g., and before the DAPS HO procedure is considered to be successfully terminated). During the DAPS handover procedure, the UE may still be able to obtain the requested SIB (or SIB segments) from the target cell(s) or the source cell(s). As such, the T350 may be stopped when the UE receives the requested SIB from the target cell or the serving cell. The target cell or serving cell may deliver the requested SIB(s) segments through UE-specific dedicated control signaling or through broadcasting system information. In some implementations, the counting T350 may be associated with the RRC entity and therefore there may only be one counting T350 timer when (at least) one DAPS bearer is configured by the NW during the handover procedure.

It should be noted that in some implementations, the UE may obtain a subset of the requested SIB(s) (or SIB segments) from the source cell and another subset of the requested SIB(s) (or SIB segments) from the target cell.

In some implementations, the UE may transmit two DedicatedSIBRequest messages to the source cell and the target cell respectively. In some implementations, the content of the two DedicatedSIBRequest messages that are delivered to the source cell and the target cell may be exactly the same. In some other implementations, different contents may be delivered to the source cell and target cell for a single dedicated SIB request (e.g., one DedicatedSIBRequest_source message may be delivered to the source cell and another DedicatedSIBRequest_target message may be delivered to the target cell). In addition, in some implementations, two independent system information enquiry procedures (e.g., a system information enquiry may be similar to what is shown in the FIG. 1), one of which is associated with the target cell and the other one being associated with the source cell, may be initiated and proceeded by the UE independently. In some such implementations, in each of the two independent system information enquiry procedure, one T350 source timer may be configured for the system information enquiry procedure associated with the source cell and another T350 target timer may be configured for the system information enquiry procedure associated with the target cell. Moreover, the UE may (re)start/count/stop each of the source and target timers (e.g., T350 source and/or T350 target timers) based on the existing configuration (e.g., as shown in the Table 3 and as described above).

D. System Information Modification

In some implementations, a counting timer (e.g., T350) may be stopped when an SI modification is triggered by the serving cell. In some implementations, the UE may stop counting the timer T350 if the UE receives an indication of system information modification (e.g., by reading the short message from the serving cell while the UE is monitoring the paging DCI or the paging message). In some implementations, the value of T350 timer may be fixed while the T350 is stopped (or not running). In some such implementations, the T350 timer may be started from the fixed value, rather than from the onDemandSIB-RequestProhibitTimer, when the T350 is activated again (e.g., at a later time).

After the UE receives the updated SIB scheduling information (e.g., that is included in the SIB1, which is broadcast by the serving cell periodically and/or continuously), the UE may activate (or restart) the T350 timer again if the SIB(s) which the UE has requested are not impacted by the system information modification. The T350 timer may then start to count based on the fixed value while it is stopped. Also, it should be noted, in some other implementations, the T350 timer may be restarted with the value of a (default/initial) variable, such as the onDemandSIB-RequestProhibitTimer.

By contrast, in some implementations, if there is at least one SIB, in which the UE is interested, is modified (or a new SIB request is generated based on the updated SIB1 by the serving cell) the UE may be triggered to send a DedicatedSIBRequest message with onDemandSIB-RequestList to the serving cell. For example, when the modified SIB is not broadcast by the serving cell, (e.g., the serving cell may indicate that one SIB (or system information) is {notbroadcast} in the SIB1), the UE may be triggered to send the DedicatedSIBRequest message with onDemandSIB-RequestList to the serving cell. Then, with the transmission of DedicatedSIBRequest message, the UE may restart the T350 timer by setting the value of T350=onDemandSIB-RequestProhibitTimer.

E. Inter-Rat Scenario

In some implementations, a UE in the NR RRC Connected state may be instructed (e.g., by the serving cell) to handover to (at least) one target cell which is operating in another RAT (e.g., E-UTRA, UTRA-FDD, etc.). For example, the serving cell may send a MobilityfromNR command to the UE (e.g., through UE-specific RRC signaling) in response to the UE sending a dedicated request message (e.g., DedicatedSIBRequest message) to the serving cell. After receiving the MobilityfromNR command, the UE may be triggered to start a (contention-free/contention-based) random access procedure with the target cell indicated by the MobilityfromNR command. After the random access procedure is completed, the UE may transmit an Inter-RAT handover complete message to the target cell to indicate an inter-RAT handover success. The aforementioned 'inter-RAT handover complete message' may be transmitted to the serving cell based on the RAT protocols associated with the target cell.

For example, in the E-UTRA protocols, the UE may send the RRCConnectionReconfigurationComplete message to the target (E-UTRA/LTE) cell as an indication of an inter-RAT handover success. Then, in some implementations, the T350 (or the described V2X-T350) may still be active until the UE sends the 'Inter-RAT handover complete message' to the target cell. In other words, in some such implementations, the T350 timer may still be counting during the whole inter-RAT handover procedure. In some implementations, the inter-RAT handover complete message may be an RRCConnectionReconfigurationComplete message in the E-UTRA protocols (e.g., when the UE handovers from an NR cell to a E-UTRA cell). Moreover, any pending SI on-demand procedure or pending DedicatedSIBRequest message may be stopped/released after the UE transmits the RRCConnectionReconfigurationComplete message to the target cell.

In some implementations, the counting T350 may be stopped/released (or removed) when the UE receives a MobilityfromNR message form the serving RAN. In addition, any pending SI on-demand procedure or pending DedicatedSIBRequest message may be stopped/released (or removed) after the UE receives the MobilityfromNR message from the serving RAN.

In some implementations, a UE that is in an NR RRC Connected state may transition to an RRC Idle state associated with other RATs (e.g., E-UTRA, etc.). Under such a scenario, the counting of T350 (if there is any) may be stopped/released while the UE is transitioning from the (NR) RRC Connected state to an (LTE/E-UTRA) RRC Idle state (or (LTE/E-UTRA) RRC Inactive state). In addition, any pending SI on-demand procedure or pending DedicatedSIBRequest message may also be stopped/released (or removed) after the UE transitions to the (LTE/E-UTRA) RRC Idle state.

In some implementations, the UE may release the stored 'OnDemandSIB-Request Configuration' if the UE receives a new 'OnDemandSIB-Request Configuration' from the serving cell (e.g., and store the new OnDemandSIB-Request Configuration).

In some implementations, the counting T350 (if there is any) may be released/stopped when the UE receives a new 'OnDemandSIB-Request Configuration' from the serving cell. The UE may then reseed a new DedicatedSIBRequest message (and also restart the T350 timer) based on the received new 'OnDemandSIB-Request Configuration'.

In some implementations, the counting T350 (if there is any) may not be released immediately when the UE receives a new 'OnDemandSIB-Request Configuration' from the serving cell. Instead, the T350 may continue counting (or running) based on the existing rules (and based on the above described embodiments), even though a new OnDemandSIB-Request Configuration is received. In addition, the UE may initiate a new DedicatedSIBRequest message (e.g., based on the new OnDemandSIB-Request Configuration) for a SIB request only after the existing T350 tier expires.

In some implementations, the above described mechanisms may be applicable to some specific SIB(s). In addition, the serving cell may explicitly indicate for which SIB(s) the UE may apply the above described mechanism through broadcasting system information (e.g., SIB1) and which SIB(s) the UE may apply the described embodiments through UE-specific dedicated control signaling (e.g., RRC signaling, such as RRCReconfiguration message) to receive a target SIB. In some implementations, for one or more SIBs the manner of applying the described mechanisms may be predefined (e.g., in the technical specification), while for other SIB(s) the manner of application of the above described mechanisms may not be explicitly indicated by the serving cell, in which case, the UE may apply a conventional approach (e.g., the UE may follow the T350 counting mechanism as shown in Table 3).

In the above-described implementations, the network (NW), Radio Access Network (RAN), cell, camped cell, serving cell, base station, gNB, eNB and ng-eNB may have been used interchangeably. In some implementations, some of these items may refer to the same network entity. Additionally, the following terms that are used in the above-described embodiments and their corresponding descriptions are provided below.

Serving Cell: For a UE in an RRC_CONNECTED state not configured with CA/DC, there is only one serving cell comprising the primary cell. For a UE in an RRC_CONNECTED state configured with CA/DC the term serving cells may be used to denote the set of cells comprising the Special Cell(s) and all secondary cells.

Special Cell: In a Dual Connectivity operation, the term Special Cell may refer to the PCell of the MCG or the PSCell of the SCG, otherwise the term Special Cell refers to the PCell.

The above-described mechanisms may be applied to any RAT. The RAT may be (but is not limited to) an NR, NR-U, LTE, or E-UTRA connected to a 5GC, an LTE connected to a 5GC, E-UTRA connected to an EPC, and an LTE connected to an EPC. The proposed embodiments may be applicable to the UEs in public networks and/or in private networks (e.g., an NPN, SNPN, PNI-NPN, etc.). The described mechanisms may be used for licensed frequencies and/or unlicensed frequencies.

System information (SI) may refer to MIB, SIB1, and other SI. Minimum SI may include MIB and SIB1. Other SI may refer to SIB3, SIB4, SIB5, and other SIB(s) (e.g., SNPN-specific SIB, PNI-NPN-specific SIB).

Dedicated signaling may refer to (but is not limited to) RRC message(s). Examples of dedicated signaling are, but not limited to, RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message. An RRC message may be one kind of dedicated signaling. The UE may receive the RRC message from the network via unicast, broadcast, or groupacast.

The RRC_CONNECTED UE, RRC_INACTIVE UE, and RRC_IDLE UE may apply the proposed implementations. An RRC_CONNECTED UE may be configured with an active (DL) BWP with common search space configured to monitor system information or paging.

Generally, the described mechanisms may be applied for the PCell and the UE. In some implementations, the described mechanisms may be applied to the PSCell and the UE. The described short messages and/or paging DCI may be transmitted by the PSCell (or a secondary node) to the UE. The UE may monitor the PDCCH monitoring occasions for the paging configured by the PSCell (or secondary node).

Allowed CAG list: is a per-PLMN list of CAG Identifiers the UE is allowed to access.

CAG cell: is a cell broadcasting at least one Closed Access Group Identifier.

CAG Member Cell: for a UE, is a cell broadcasting the identity of the selected PLMN, registered PLMN or equivalent PLMN, and for that PLMN, a CAG identifier belonging to the Allowed CAG list of the UE for that PLMN.

Closed Access Group Identifier: identifies a CAG within a PLMN.

Network Identifier: identifies an SNPN in combination with a PLMN ID.

Non-Public Network: is a network deployed for non-public use.

NPN-only Cell: is a cell that is only available for normal service for NPNs' subscriber. An NPN-capable UE determines that a cell is NPN-only Cell by detecting that the cellReservedForOtherUse IE is set to true while the npn-IdentityInfoList IE is present in CellAccessRelatedInfo IE.

PNI-NPN identity: is an identifier of a PNI-NPN compromising of a PLMN ID and a CAG -ID combination.

Registered SNPN: is the SNPN on which certain Location Registration outcomes have occurred.

Selected SNPN: is the SNPN that has been selected by the NAS (e.g., the NAS of the UE, the NAS of the CN), either manually or automatically.

SNPN Access Mode: is a mode of operation wherein the UE only selects SNPNs.

SNPN identity: is an identifier of an SNPN comprising of a PLMN ID and an NID combination.

SNPN-only cell: is a cell that is only available for normal service for SNPN subscribers.

An NPN-capable UE may correspond to a UE supporting CAG (or NPN).

Child node: I is an AB-node-DU's next hop neighbour node; the child node is also an IAB-node.

Parent node: is an IAB-node-MT's next hop neighbour node; the parent node can be IAB-node or IAB-donor-DU.

Downstream: is a direction toward child node or UE in IAB-topology.

Upstream: is a direction toward parent node in IAB-topology.

IAB-donor: is a gNB that provides network access to UEs via a network of backhaul and access links.

IAB-DU: is a gNB-DU functionality supported by the IAB-node to terminate the NR access interface to UEs and next-hop IAB-nodes, and to terminate the F1 protocol to the gNB-CU functionality, as defined in 3GPP TS 38.401 v16.1.0, on the IAB-donor IAB-MT: is an IAB-node function that terminates the Uu interface to the parent node using the procedures and behaviours specified for UEs unless stated otherwise. IAB-MT function used in 38series of 3GPP Specifications corresponds to IAB-UE function defined in 3GPP TS 23.501 v16.4.0.

IAB-node: is a RAN node that supports NR access links to UEs and NR backhaul links to parent nodes and child nodes. The IAB-node may or may not support backhauling via LTE.

Multi-hop backhauling: uses a chain of NR (and/or LTE) backhaul links between an IAB-node and an IAB-donor-gNB.

NR backhaul link: is an NR link used for backhauling between an IAB-node and an IAB-donor-gNB, and between IAB-nodes in case of a multi-hop backhauling.

LTE backhaul link: is an LTE link used for backhauling between an IAB-node and an IAB-donor-gNB, and between IAB-nodes in case of a multi-hop backhauling.

Multi-Radio Dual Connectivity (MR-DC): is a Dual Connectivity between E-UTRA and NR nodes, or between two NR nodes. MR-DC may include E-UTRA-NR Dual Connectivity (EN-DC), NR-E-UTRA Dual Connectivity (NE-DC), NG-RAN E-UTRA-NR Dual Connectivity (NGEN-DC), and NR-NR Dual Connectivity (NR-DC).

Master Cell Group: in MR-DC, is a group of serving cells associated with the Master Node, comprising of the SpCell (PCell) and optionally one or more SCells.

Master node: in MR-DC, is the radio access node that provides the control plane connection to the core network. It may be a Master eNB (in EN-DC), a Master ng-eNB (in NGEN-DC) or a Master gNB (in NR-DC and NE-DC).

Secondary Cell Group: in MR-DC, is a group of serving cells associated with the Secondary Node, comprising of the SpCell (PS Cell) and optionally one or more SCells.

Secondary node: in MR-DC, is the radio access node, with no control plane connection to the core network, providing additional resources to the UE. It may be an en-gNB (in EN-DC), a Secondary ng-eNB (in NE-DC) or a Secondary gNB (in NR-DC and NGEN-DC).

MeNB or Master eNB: is an eNB as a master node associated with an MCG (Master Cell Group) in MR-DC scenarios.

SgNB: Secondary gNB, is a gNB as a secondary node associated to an SCG (Secondary Cell Group) in MR-DC scenarios.

The first indication may be associate with the NR, LTE connected to EPC, and/or LTE connected to the 5GC. The second indication may be associated with the NR, LTE connected to the EPC, and/or LTE connected to the 5GC. The first indication and the second indication may be associated with the same RAT (e.g., NR, LTE connected to EPC, LTE connected to 5GC) or different RATs. The UE supporting one RAT (e.g., IAB functionality via NR and/or NPN functionality via NR, if the one RAT is NR) may apply for the first indication associated with the NR and/or the second indication associated with the NR. The UE supporting the one RAT may apply for (or ignore) the first indication not associated with the NR and/or the second indication not associated with the NR.

In the presented implementations, if the UE considers itself barred by a cell or if the UE bars a cell, the UE may bar the cell for a period of time (e.g., 300 s). The UE may not consider the cell as a candidate cell for cell (re)selectin for a period of time (e.g., 300 s).

In the presented implementations, if the UE changes from the SNPN access mode to the PLMN access mode, (the NAS entity of) the UE may release (or delete or discard) the (stored or maintained) list of SNPN ID(s) if any.

In the presented implementations, if the UE changes from the PLMN access mode to the SNPN access mode, (the NAS entity of) the UE may release (or delete or discard) the (stored or maintained) list of PLMN ID(s) if any.

DCI: is Downlink Control Information. A DCI may refer to a PDCCH resource with CRC (Cyclic Redundancy Check) scrambled by an RNTI (Radio Network Temporary Identifier). The RNTI may relate to IAB. Alternatively, the implementations regarding DCI may be applied for a physical signal.

MAC CE: is a Medium Access Control—Control Element. A MAC CE is a bit string that is byte aligned (i.e., multiple of 8 bits) in length.

In the presented implementations, if the UE with IAB functionality determines itself to be an IAB node or operate as an IAB node, and/or if the UE performs the design for IAB, and/or if the UE operates the IAB functions, the UE may transmit an indication to inform the network via dedicated signaling.

DAPS bearer: is a bearer radio protocols of which are located in both the source gNB and the target gNB during DAPS handover to use both source gNB and target gNB resources.

Figure 7:
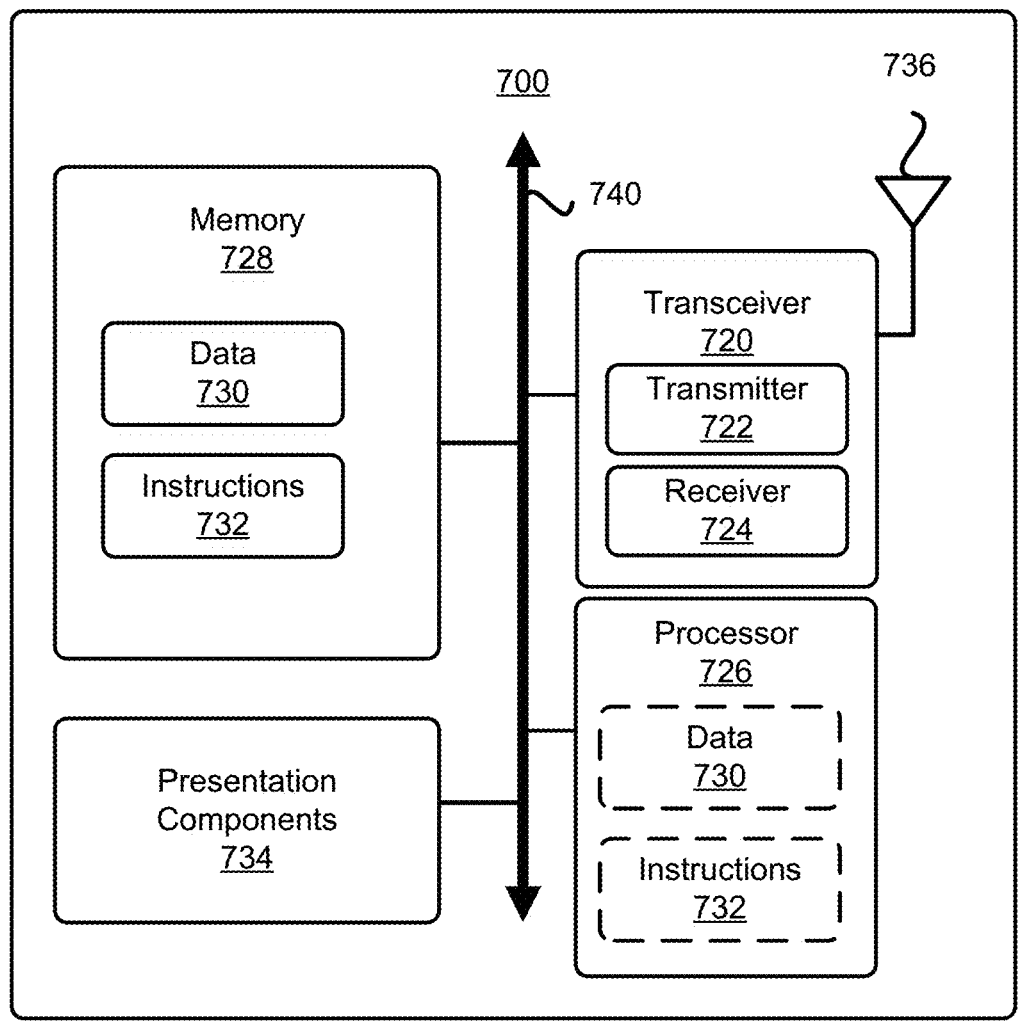
FIG. 7 illustrates a block diagram of a node for wireless communication, according to one example implementation of the present application.

FIG. 7 illustrates a block diagram of a node for wireless communication, according to one example implementation of the present application. As shown in FIG. 7, node 700 may include transceiver 720, processor 726, memory 728, one or more presentation components 734, and at least one antenna 736. Node 700 may also include a Radio Frequency (RF) spectrum band module, a base station communications module, a network communications module, and a system communications management module, input/output (I/O) ports, I/O components, and power supply (not explicitly shown in FIG. 7). Each of these components may be in communication with each other, directly or indirectly, over one or more buses 740.

Transceiver 720 having transmitter 722 and receiver 724 may be configured to transmit and/or receive time and/or frequency resource partitioning information. In some implementations, transceiver 720 may be configured to transmit in different types of subframes and slots including, but not limited to, usable, non-usable and flexibly usable subframes and slot formats. Transceiver 720 may be configured to receive data and control signaling.

Node 700 may include a variety of computer-readable media. Computer-readable media can be any available media that can be accessed by node 700 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or other data.

Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 728 may include computer-storage media in the form of volatile and/or non-volatile memory. Memory 728 may be removable, non-removable, or a combination thereof. Exemplary memory includes solid-state memory, hard drives, optical-disc drives, etc. As illustrated in FIG. 7, memory 728 may store computer-readable, computer-executable instructions 732 (e.g., software codes) that are configured to, when executed, cause processor 726 to perform various functions described herein, for example, with reference to FIGS. 1 through 7. Alternatively, instructions 732 may not be directly executable by processor 726 but be configured to cause node 700 (e.g., when compiled and executed) to perform various functions described herein.

Processor 726 may include an intelligent hardware device, for example, a central processing unit (CPU), a microcontroller, an ASIC, etc. Processor 726 may include memory. Processor 726 may process data 730 and instructions 732 received from memory 728, and information through transceiver 720, the base band communications module, and/or the network communications module. Processor 726 may also process information to be sent to transceiver 720 for transmission through antenna 736, to the network communications module for transmission to a core network.

One or more presentation components 734 presents data indications to a person or other device. For example, one or more presentation components 734 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) for requesting a target system information block (SIB) associated with a target service, the method comprising:
   receiving at least one SIB segment of a plurality of SIB segments, the plurality of SIB segments being required to assemble a target SIB;
   storing the at least one SIB segment and
   before all SIB segments in the plurality of SIB segments are received to assemble the target SIB, initiating a dedicated SIB request procedure by transmitting, to a serving cell, a request for the target SIB.

2. The method of claim 1, further comprising:
   starting a timer upon transmitting the request to the serving cell, wherein a second dedicated SIB request procedure is not initiated while the timer is running;
   receiving remaining SIB segments in the plurality of SIB segments that are not stored at the UE;
   assembling the target SIB based on the received and stored plurality of SIB segments while the timer is running; and
   stopping the timer after successfully assembling the target SIB.

3. The method of claim 2, wherein receiving the remaining SIB segments comprises receiving the remaining SIB segments from the serving cell via UE-specific downlink control signaling.

4. The method of claim 1, further comprising:
   starting a timer upon transmitting the request to the serving cell, wherein a second dedicated SIB request procedure is not initiated while the timer is running;
   receiving, from the serving cell, a second plurality of SIB segments associated with the target SIB;
   assembling the target SIB based on the received second plurality of SIB segments while the timer is running;
   dropping the stored at least one SIB segment of the plurality of SIB segments after assembling the target SIB; and
   stopping the timer after successfully assembling the target SIB based on the received second plurality of SIB segments.

5. The method of claim 4, wherein receiving the second plurality of SIB segments comprises receiving the second plurality of SIB segments after switching from a current active down link (DL) bandwidth part (BWP) to a second active DL BWP that is configured with at least one common search space for receiving system information.

6. The method of claim 1, further comprising:
   after transmitting the request, receiving, from the serving cell, the target SIB via a UE-specific downlink control signaling; and
   dropping the stored at least one SIB segment of the plurality of SIB segments after receiving the target SIB.

7. The method of claim 1, wherein initiating the dedicated SIB request procedure comprises initiating the dedicated SIB request procedure when the UE is not configured with any common search space for receiving system information on any of currently active downlink bandwidth parts (BWPs) associated with the UE.

8. The method of claim 1, wherein the target service comprises a new radio (NR) sidelink communication service and the target SIB comprises an NR sidelink radio configuration including an access stratum (AS) configuration for the UE to implement the NR sidelink communication service.

9. The method of claim 8, further comprising:
   selecting a second serving cell to move from the serving cell; and
   after moving to the second serving cell, implementing the NR sidelink communication service based on the NR sidelink radio configuration included in the target SIB received in the serving cell after determining that the target SIB is still valid on the second serving cell.

10. The method of claim 8, further comprising:
    switching a radio resource control (RRC) state of the UE from an RRC Connected state to one of an RRC Inactive state or an RRC Idle state; and
    implementing the NR sidelink communication service based on the NR sidelink radio configuration included in the target SIB after switching the RRC state of the UE.

11. A user equipment (UE), comprising:
    one or more non-transitory computer-readable media storing one or more computer-executable instructions for requesting a target system information block (SIB) associated with a target service; and
    at least one processor coupled to the one or more non-transitory computer-readable media, and configured to execute the one or more computer-executable instructions to:
      receive at least one SIB segment of a plurality of SIB segments, the plurality of SIB segments being required to assemble a target SIB;
      store the at least one SIB segment; and
      before all SIB segments in the plurality of SIB segments are received to assemble the target SIB, initiate a dedicated SIB request procedure by transmitting, to a serving cell, a request for the target SIB.

12. The UE of claim 11, wherein the at least one processor is further configured to execute the one or more computer-executable instructions to:
    start a timer upon transmitting the request to the serving cell, wherein a second dedicated SIB request procedure is not initiated while the timer is running;
    receive remaining SIB segments in the plurality of SIB segments that are not stored at the UE;
    assemble the target SIB based on the received and stored plurality of SIB segments while the timer is running; and
    stop the timer after successfully assembling the target SIB.

13. The UE of claim 12, wherein receiving the remaining SIB segments comprises receiving the remaining SIB segments from the serving cell via UE-specific downlink control signaling.

14. The UE of claim 11, wherein the at least one processor is further configured to execute the one or more computer-executable instructions to:
start a timer upon transmitting the request to the serving cell, wherein a second dedicated SIB request procedure is not initiated while the timer is running;
receive, from the serving cell, a second plurality of SIB segments associated with the target SIB;
assemble the target SIB based on the received second plurality of SIB segments while the timer is running;
drop the stored at least one SIB segment of the plurality of SIB segments after assembling the target SIB; and
stop the timer after successfully assembling the target SIB based on the received second plurality of SIB segments.

15. The UE of claim 14, wherein receiving the second plurality of SIB segments comprises receiving the second plurality of SIB segments after switching from a current active down link (DL) bandwidth part (BWP) to a second active DL BWP that is configured with at least one common search space for receiving system information.

16. The UE of claim 11, wherein the at least one processor is further configured to execute the one or more computer-executable instructions to:
after transmitting the request, receive, from the serving cell, the target SIB via a UE-specific downlink control signaling;
drop the stored at least one SIB segment of the plurality of SIB segments after receiving the target SIB.

17. The UE of claim 11, wherein initiating the dedicated SIB request procedure comprises initiating the dedicated SIB request procedure when the UE is not configured with any common search space for receiving system information on any of currently active downlink bandwidth parts (BWPs) associated with the UE.

18. The UE of claim 11, wherein the target service comprises a new radio (NR) sidelink communication service and the target SIB comprises an NR sidelink radio configuration including an access stratum (AS) configuration for the UE to implement the NR sidelink communication service.

19. The UE of claim 18, wherein the at least one processor is further configured to execute the one or more computer-executable instructions to:
select a second serving cell to move from the serving cell; and
after moving to the second serving cell, implement the NR sidelink communication service based on the NR sidelink radio configuration included in the target SIB received in the serving cell after determining that the target SIB is still valid on the second serving cell.

20. The UE of claim 18, wherein the at least one processor is further configured to execute the one or more computer-executable instructions to:
switch a radio resource control (RRC) state of the UE from an RRC Connected state to one of an RRC Inactive state or an RRC Idle state; and
implement the NR sidelink communication service based on the NR sidelink radio configuration included in the target SIB after switching the RRC state of the UE.

* * * * *